United States Patent
Hatanaka et al.

(10) Patent No.: US 9,292,968 B2
(45) Date of Patent: Mar. 22, 2016

(54) MAPPING PROCESSING METHOD AND DEVICE

(71) Applicant: FUJITSU LIMITED, Kawasaki-shi, Kanagawa (JP)

(72) Inventors: Kohei Hatanaka, Fujisawa (JP); Masaki Kazama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/515,149

(22) Filed: Oct. 15, 2014

(65) Prior Publication Data

US 2015/0116322 A1  Apr. 30, 2015

(30) Foreign Application Priority Data

Oct. 24, 2013  (JP) .................................. 2013-221556

(51) Int. Cl.
*G06T 17/20* (2006.01)
*G06T 15/04* (2011.01)

(52) U.S. Cl.
CPC .................. *G06T 17/20* (2013.01); *G06T 15/04* (2013.01)

(58) Field of Classification Search
USPC ................... 345/419, 420, 423, 440, 582, 442
See application file for complete search history.

(56) References Cited

U.S. PATENT DOCUMENTS

| 8,259,101 B2* | 9/2012 | Shimada | G06F 17/5095 345/419 |
| 8,600,708 B1* | 12/2013 | Mallet | G06T 17/05 703/2 |
| 8,743,115 B1* | 6/2014 | Mallet | G01V 1/302 345/419 |
| 8,933,932 B2* | 1/2015 | Huysmans | G06T 17/20 345/419 |
| 9,098,926 B2* | 8/2015 | Quan | G06K 9/00704 |
| 2006/0170695 A1* | 8/2006 | Zhou | G06T 15/04 345/582 |
| 2008/0238919 A1* | 10/2008 | Pack | G06T 15/04 345/420 |
| 2008/0309664 A1* | 12/2008 | Zhou | G06T 13/40 345/420 |
| 2010/0220895 A1* | 9/2010 | Koren | G01V 1/345 382/109 |

OTHER PUBLICATIONS

Gu et al., "Computing Conformal Structures of Surfaces", Communications in Information and Systems, vol. 2, No. 2, pp. 121-145, Dec. 2002.
Saba et al., "Practical Spherical Embedding of Manifold Triangle Meshes", Proceedings of the International Conference on Shape Modeling and Applications(SMI'05), 2005.

* cited by examiner

*Primary Examiner* — Kimbinh T Nguyen
(74) *Attorney, Agent, or Firm* — Staas & Halsey LLP

(57) ABSTRACT

A mapping method includes; mapping first and second models, each represented by polygonal elements of meshes and including a same number of regions, to a first and a second spherical surfaces, respectively; approximating boundaries of the regions by curves and moving nodes based on the curve approximation; associating the nodes on the boundary of first sphere with points on the boundary of the second sphere; moving the nodes other than the nodes on the boundary by minimizing changes of shapes and areas of the polygonal elements under a constraint that the nodes on the boundary of the first sphere are placed at positions corresponding to the associated points on the second sphere; and calculating a point in the second model for each of the nodes in the first model, from the corresponding node after the movement on the first sphere and corresponding polygonal elements on the second sphere.

7 Claims, 29 Drawing Sheets

MAPPING PROCESSING METHOD AND DEVICE

CROSS-REFERENCE TO RELATED APPLICATION

This application is based upon and claims the benefit of priority of the prior Japanese Patent Application No. 2013-221556 filed on Oct. 24, 2013, the entire contents of which are incorporated herein by reference.

FIELD

The embodiment discussed herein is related to a technique for mapping a first model to a second model.

BACKGROUND

In the computer graphics (CG) field, there are various methods for obtaining correspondences between two shape models represented by triangular mesh elements in morphing or the like. There are also a method for obtaining correspondences between points among all points and a method for obtaining correspondences between all the points.

Surface parameterization is a method for mapping (or executing bijection) a three-dimensionally spatial surface to a certain region (plain surface, sphere, or the like) and is used in order to execute texture mapping or re-meshing in the CG field. The surface parameterization is generally executed in order to map such a surface to a plain space in many cases and map such a surface to a spherical space in some cases.

For example, it is assumed that the surface parameterization is executed so as to map two shapes (surfaces) represented by triangular mesh elements to a spherical space, calculate corresponding points on the same spherical space, and execute mapping between the two shapes.

In this case, it is assumed that the two shapes have label information items in regions that are defined for the shapes, respectively. In order to appropriately map the label information items, boundaries between regions for which different label information items are provided overlap (or match) each other on a spherical surface to which the shapes have been mapped. However, the boundaries may not be appropriately mapped to the spherical surface by the conventional surface parameterization.

A case where a hand model A illustrated in FIG. 1 is mapped to a hand model B illustrated in FIG. 2 is considered. Finger labels are added to fingers of the hand models A and B, while palm labels are added to palms of the hand models A and B. A spherical model A is generated by mapping the hand model A to a spherical surface illustrated in FIG. 3, while a spherical model B is generated by mapping the hand model B to a spherical surface illustrated in FIG. 4. After that, the spherical model A is mapped to the spherical model B so as to ensure that boundaries of regions to which the finger labels are added in the spherical models A and B match each other.

The conventional surface parameterization supports mapping of a surface to a spherical surface. In this case, the position of a node $x_i \in X$ is calculated by minimizing the following energy based on a spring model having a spring constant $w_{ij}$ between the node $x_i$ and a node $x_j$.

$$X = \arg \min_X \sum_i \sum_{j \in N(i)} w_{ij} \|x_i - x_j\|^2 \quad (1)$$

s.t.

$$\|x_i\| = 1$$

Since the spherical surface is a surface, a method that is the same as or similar to the aforementioned method may be used for mapping of a spherical surface to another spherical surface. However, the position of the node $x_i \in X$ is calculated by minimizing, based on the spring model, the energy that causes nodes to be placed on the spherical surface under a constraint that boundaries between regions of the spherical model A are fixed to boundaries between corresponding regions of the spherical model B.

Although it looks as if approximately appropriate process results are obtained as illustrated in FIG. 5, microscopic white parts are generated at a boundary between the thumb and the palm as illustrated in FIG. 6, and microscopic white parts are generated at a boundary between the little finger and the palm as illustrated in FIG. 7. The white parts generated at the boundaries indicate that triangular mesh elements are reversed.

FIG. 8 illustrates normal triangular elements of a mesh, while FIG. 9 illustrates the state of a reversed part in which a node 1000 is placed on a triangular element 200.

Since the energy according to the conventional technique is based on the spring model, the energy may be stable in a state in which a spring is reversed. In the state illustrated in FIG. 9, however, bijection is not achieved and a label may not be mapped.

Examples of related art are "XIANFENG GU and SHING-TUNG YAU, "COMPUTING CONFORMAL STRUCTURES OF SURFACES", COMMUNICATIONS IN INFORMATION AND SYSTEMS, Vol. 2, pp. 121-146, December, 2002" and "Shadi Saba, Irad Yavneh, Craig Gotsman and Alla Sheffer, "Practical Spherical Embedding of Manifold Triangle Meshes", Proceedings of the International Conference on Shape Modeling and Applications (SMI'05), 2005".

According to an aspect, an object of the disclosure is to provide a technique for mapping a first model to a second model while achieving bijection.

SUMMARY

According to an aspect of the invention, a mapping processing method includes; mapping a first and a second models, each represented by polygonal elements of a first and a second meshes and including a same number of regions, to a first and a second spherical surfaces, respectively; approximating boundaries of the regions by curves and moving nodes other than nodes on the boundaries of the regions based on the curve approximation; associating the nodes on the boundary of the regions mapped to the first spherical surface with points on the boundary of the regions mapped to the second spherical surface; moving the nodes other than the nodes on the boundary by minimizing changes of the shapes and areas of the polygonal elements of the first mesh under a constraint that the nodes on the boundary of the regions mapped to the first spherical surface are placed at positions on the first spherical surface corresponding to the associated points on the second spherical surface; and calculating a point in the second model for each of the nodes in the first model, from the corresponding node after the movement on the first spherical surface and corresponding polygonal elements on the second spherical surface.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 10:
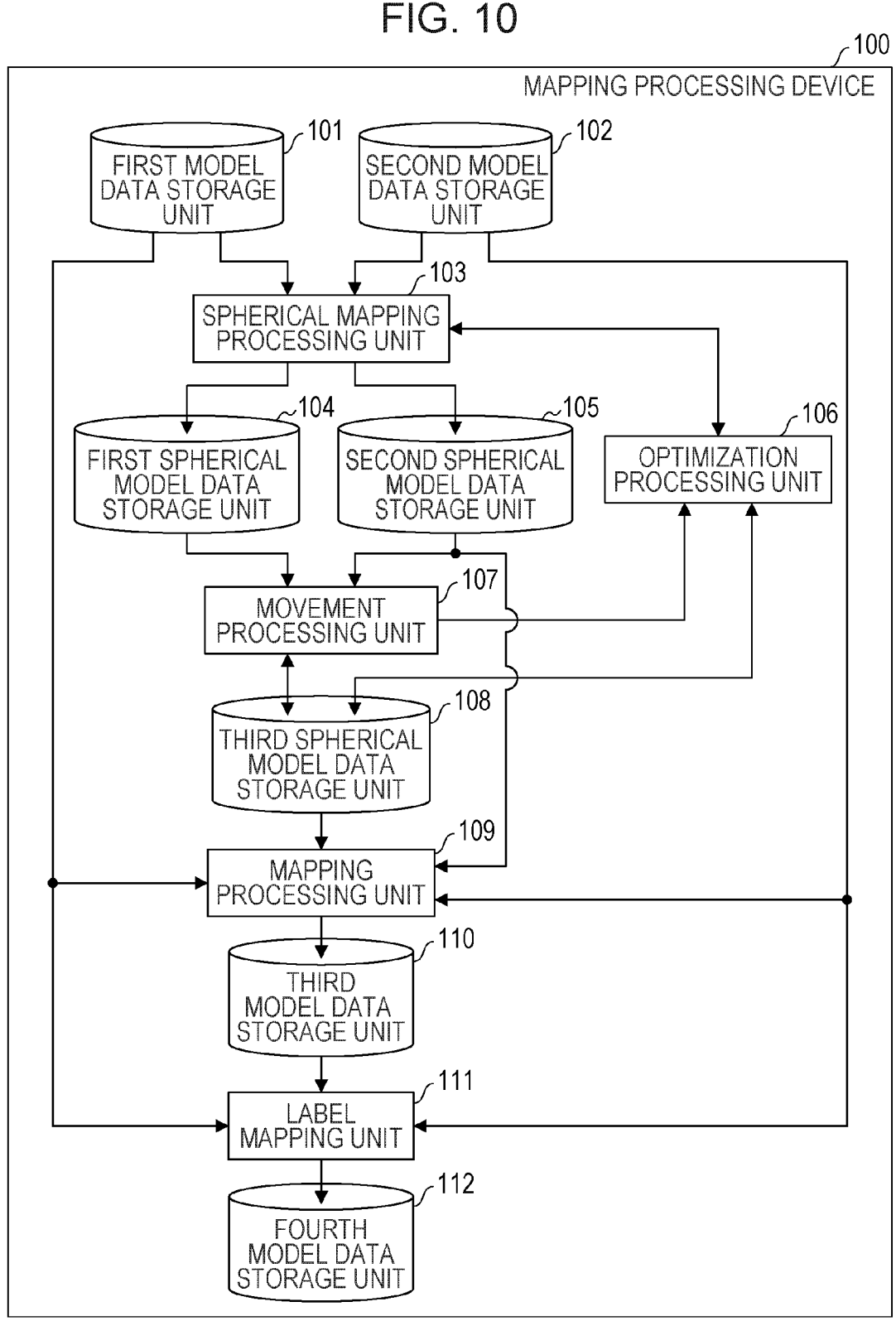
FIG. 10 is a functional block diagram of a mapping processing device according to an embodiment.

FIG. 10 is a functional block diagram of a mapping processing device according to an embodiment. The mapping processing device 100 according to the embodiment includes a first model data storage unit 101, a second model data storage unit 102, a spherical mapping processing unit 103, a first spherical model data storage unit 104, a second spherical model data storage unit 105, an optimization processing unit 106, a movement processing unit 107, a third spherical model data storage unit 108, a mapping processing unit 109, a third model data storage unit 110, a label mapping unit 111, and a fourth model data storage unit 112.

Figure 1:
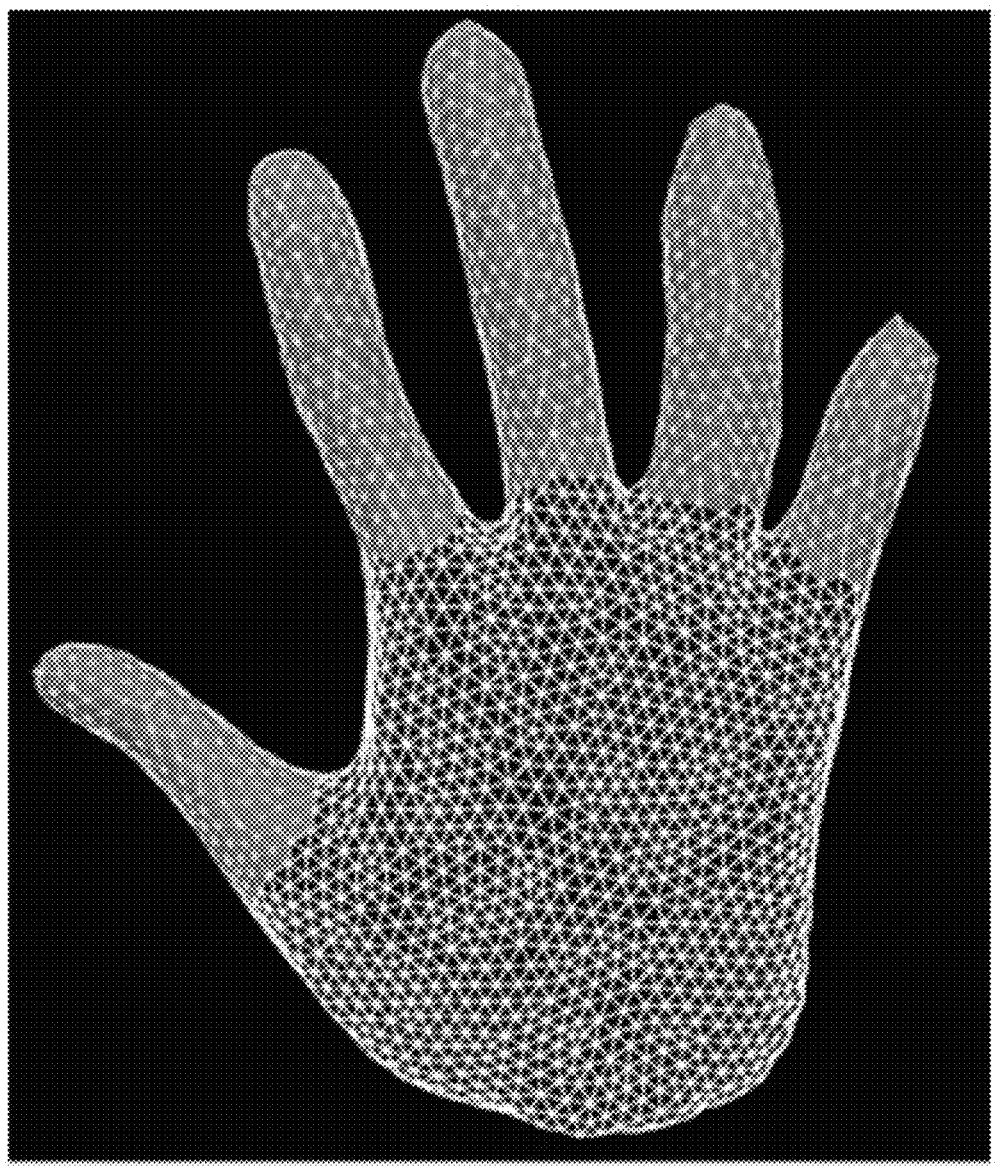
FIG. 1 is a diagram illustrating an example of a first model (hand model A)
Figure 11:
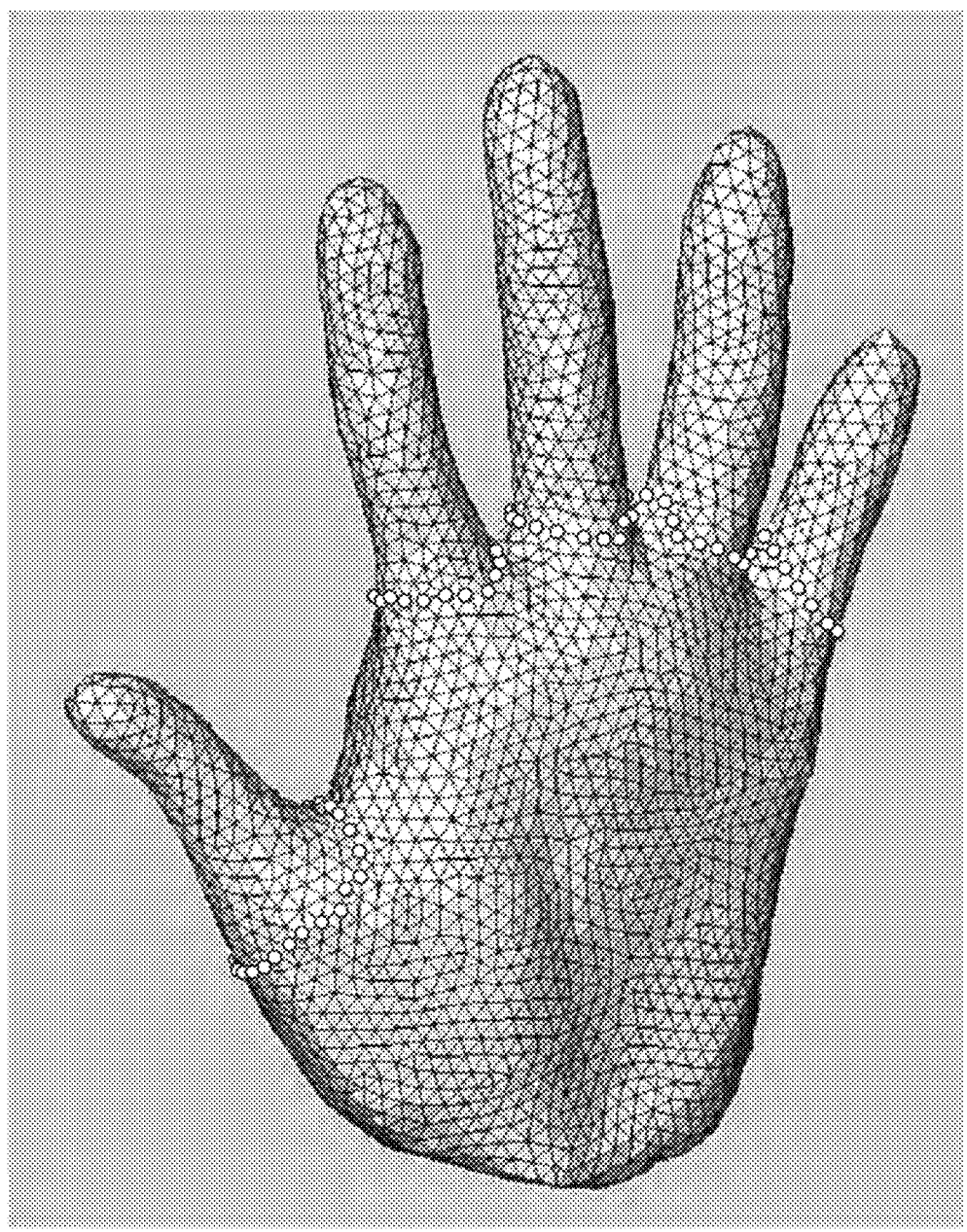
FIG. 11 is a diagram illustrating an example of a first model (hand model A)

The first model data storage unit 101 has, stored therein, first model data (data of a hand model A) (labels that each represent a finger region or a palm region are set to nodes) illustrated in FIG. 1. In the embodiment, as illustrated in FIG. 11, the hand model A is divided into triangular mesh elements, and boundary points (white circles) are set on a boundary between the finger region and the palm region.

Figure 2:
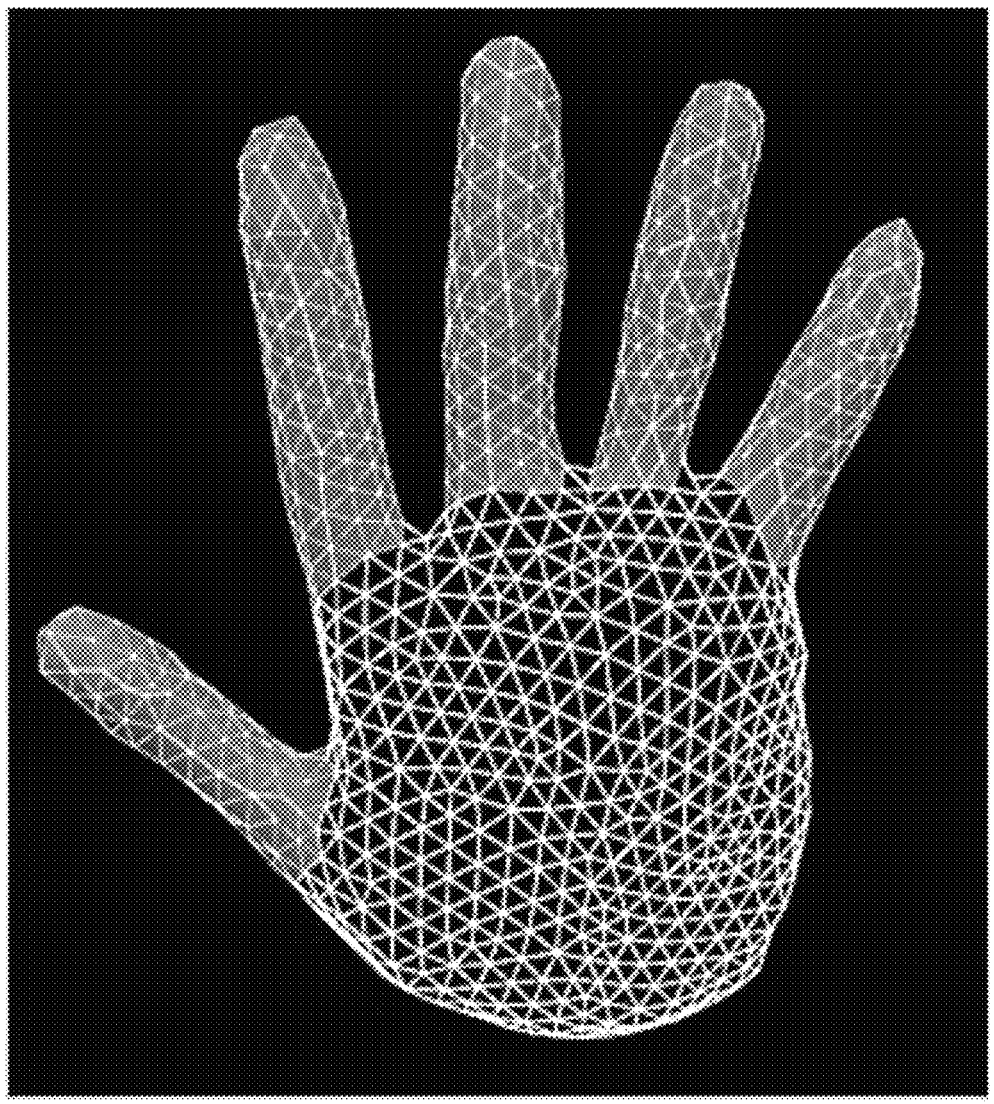
FIG. 2 is a diagram illustrating an example of a second model (hand model B)
Figure 3:
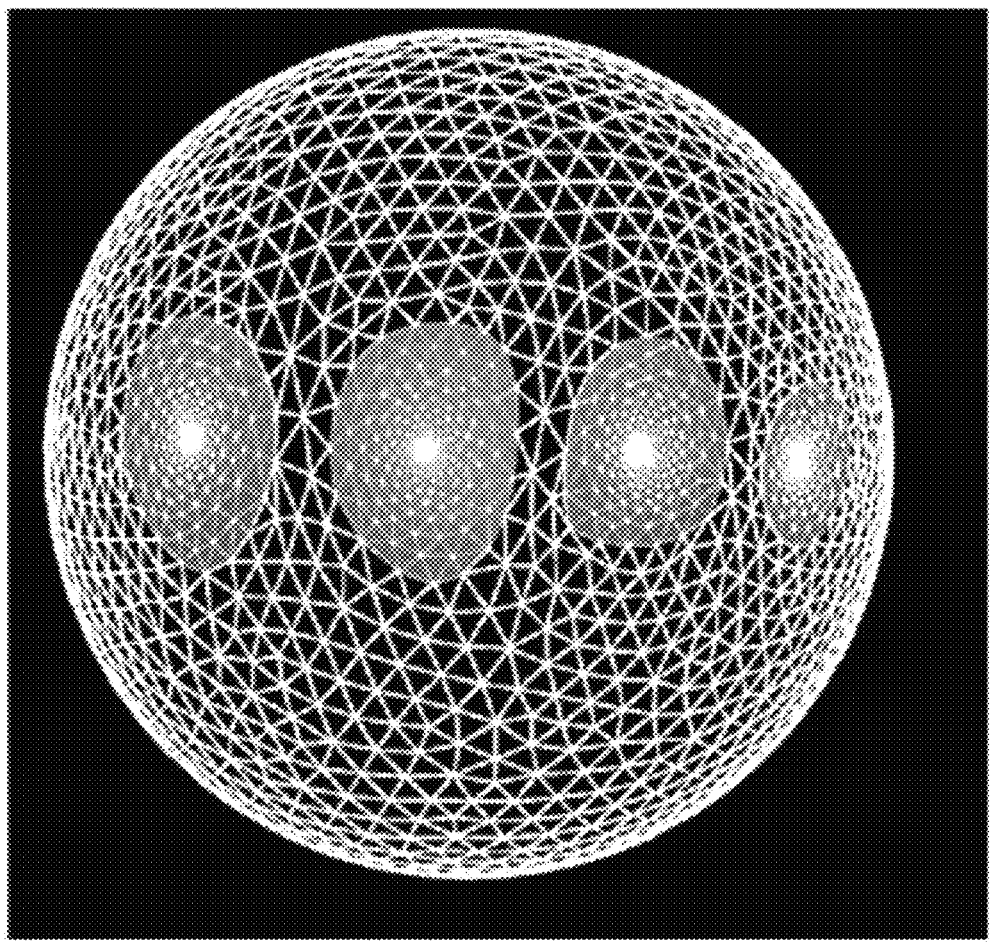
FIG. 3 is a diagram illustrating an example of a first spherical model (spherical model A)
Figure 4:
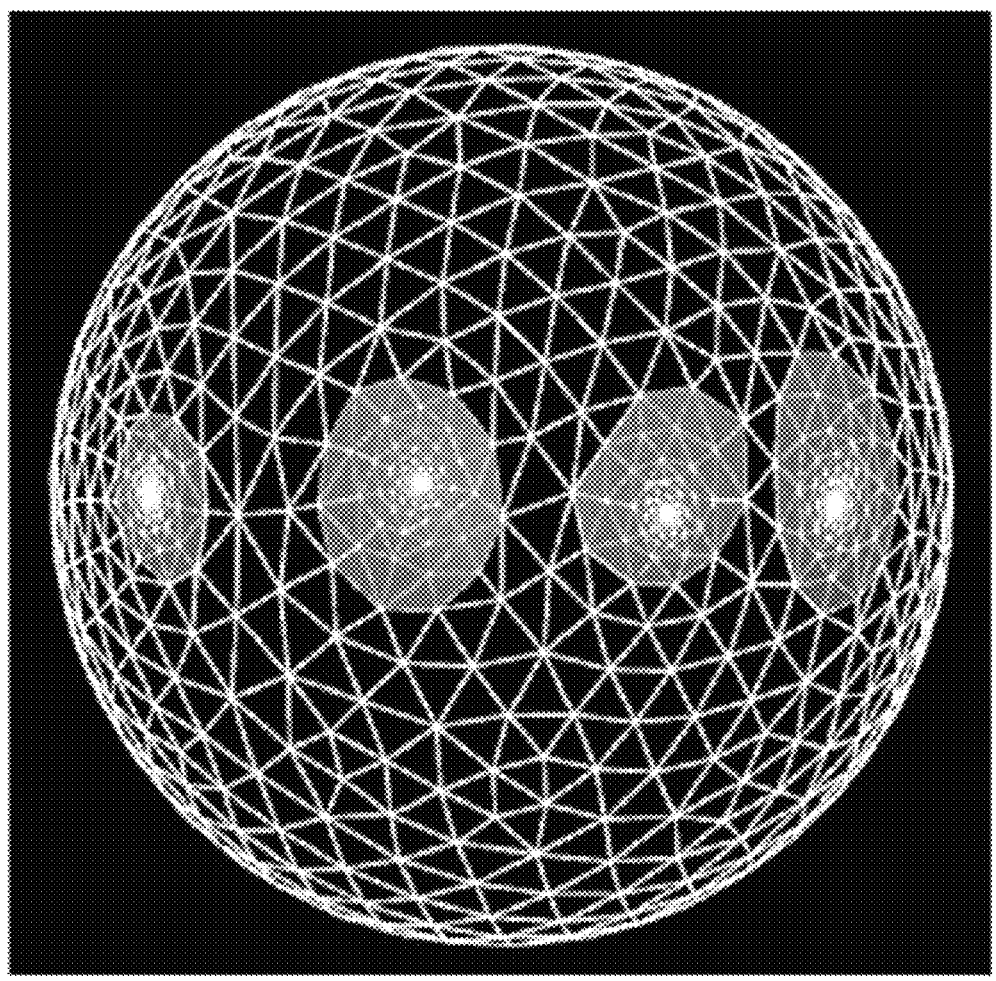
FIG. 4 is a diagram illustrating an example of a second spherical model (spherical model B)
Figure 5:
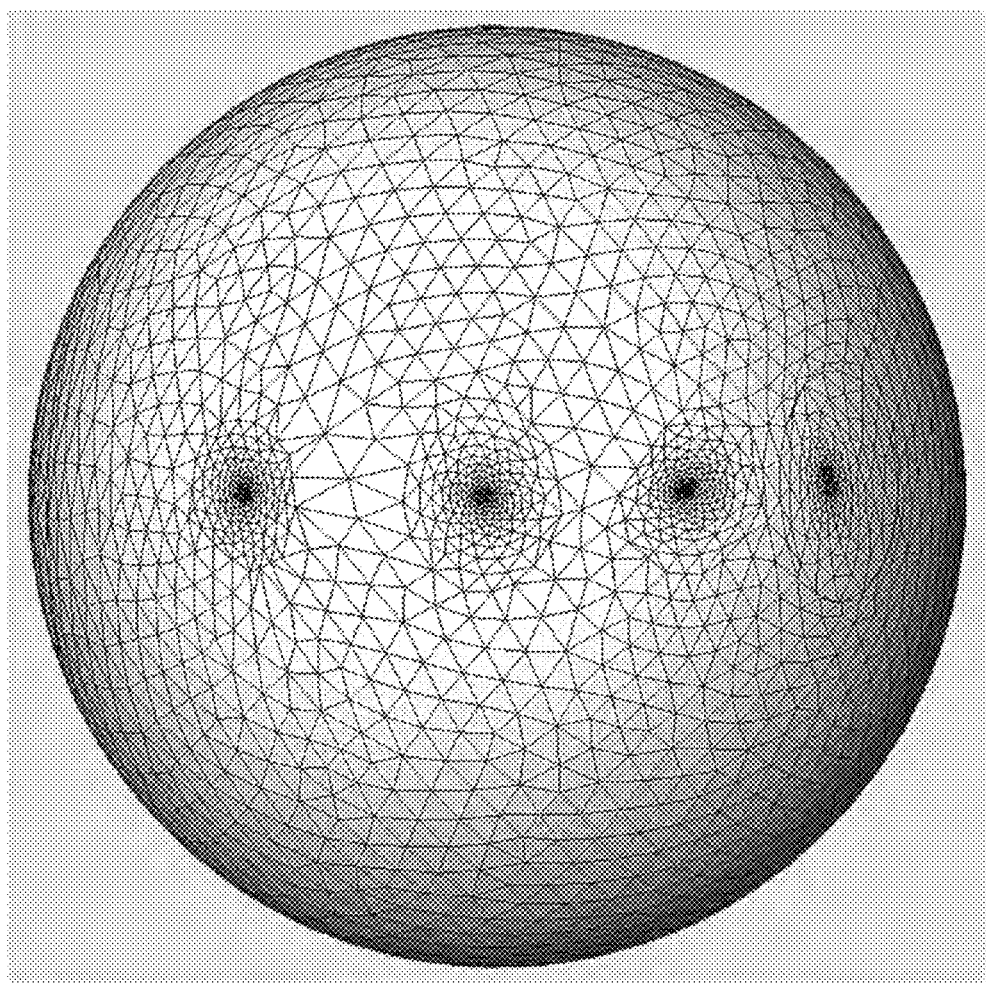
FIG. 5 is a diagram illustrating an example of a spherical model after mapping according to a conventional technique.
Figure 6:
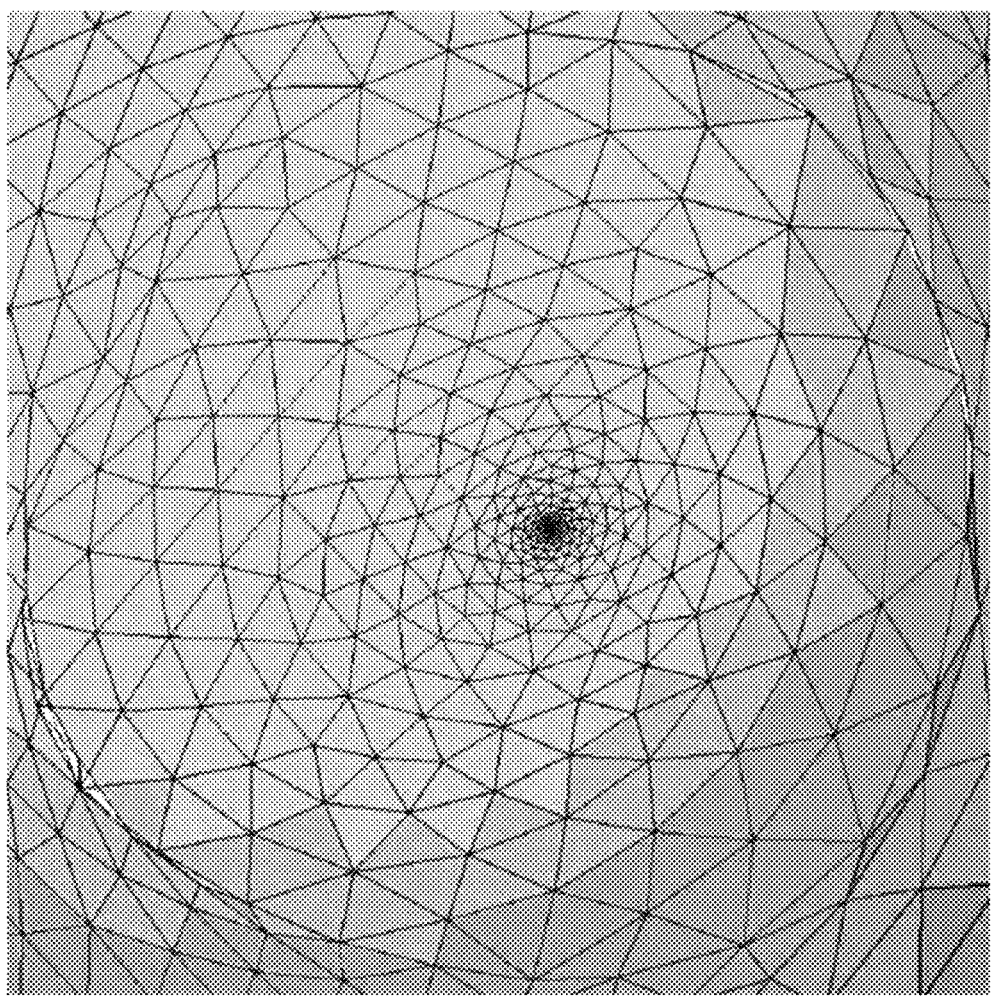
FIG. 6 is a diagram illustrating a problem with the conventional technique.
Figure 7:
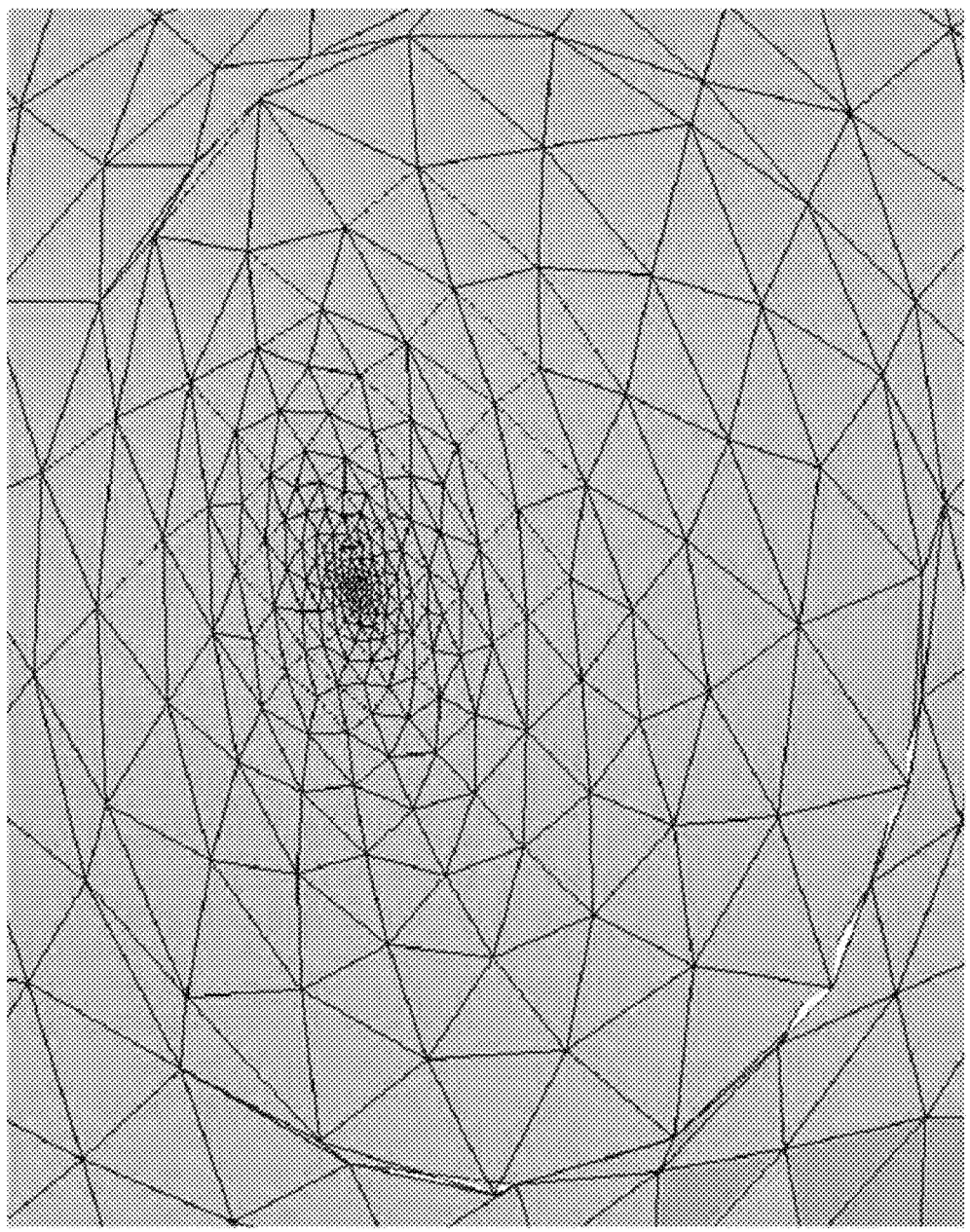
FIG. 7 is a diagram illustrating a problem with the conventional technique.
Figure 8:
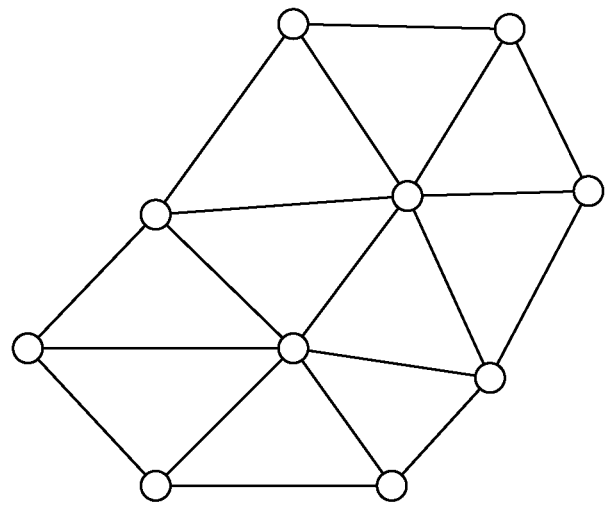
FIG. 8 is a diagram illustrating an example of triangular elements of a normal mesh.
Figure 9:
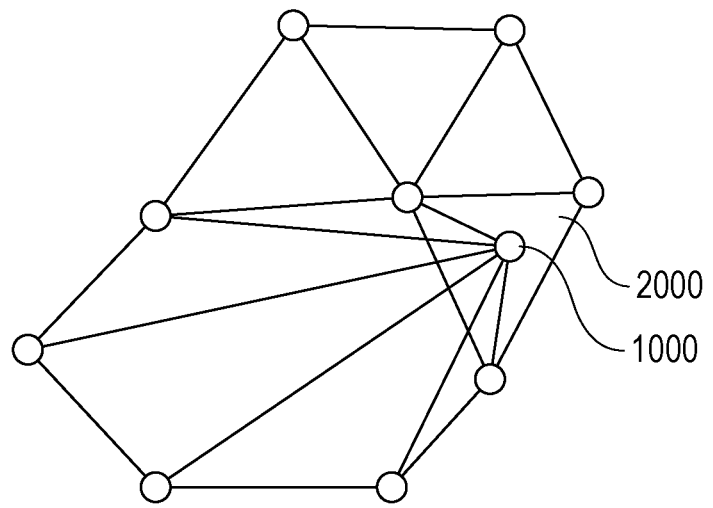
FIG. 9 is a diagram illustrating an example of triangular elements of a mesh in which a reversed part is generated.
Figure 12:
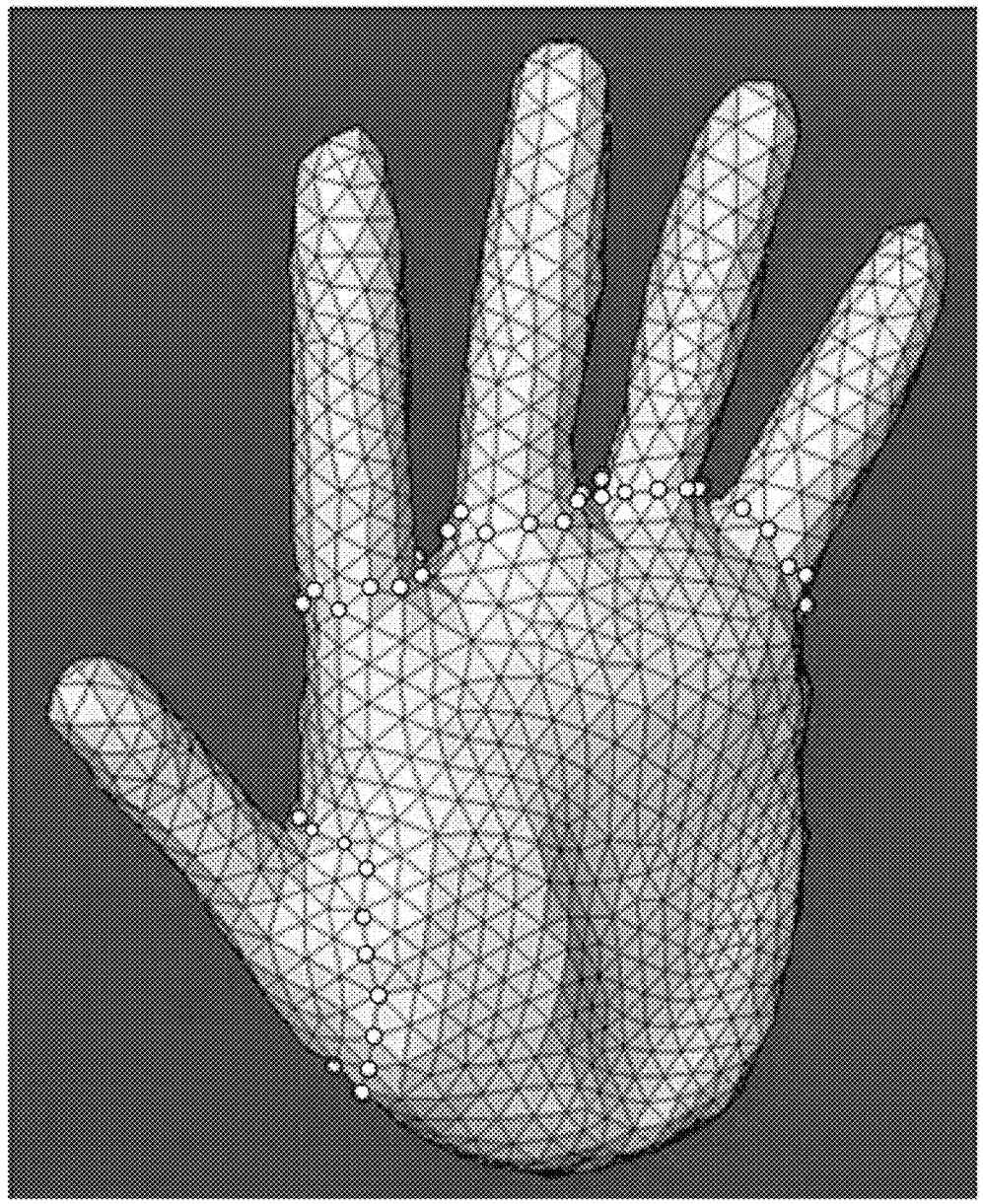
FIG. 12 is a diagram illustrating an example of a second model (hand model B)

The second model data storage unit 102 has, stored therein, second model data (data of a hand model B) (labels that each represent a finger region or a palm region are set to nodes) illustrated in FIG. 2. In the embodiment, as illustrated in FIG. 12, the hand model B is divided into triangular mesh elements, and boundary points (white circles) are set on a boundary between the finger region and the palm region.

The spherical mapping processing unit 103 generates a first spherical model (or a spherical model A) by mapping the hand model A stored in the first model data storage unit 101 to a spherical surface and causes the generated first spherical model to be stored in the first spherical model data storage unit 104. In addition, the spherical mapping processing unit 103 generates a second spherical model (or a spherical model B) by mapping the hand model B stored in the second model data storage unit 102 to a spherical surface and causes the generated second spherical model to be stored in the second spherical model data storage unit 105.

The movement processing unit 107 executes a process of moving nodes on boundary lines of the first spherical model to corresponding boundary lines of the second spherical model. The optimization processing unit 106 executes a process of fixing the nodes on the boundary lines and optimizing the positions of nodes other than the nodes on the boundary lines by minimizing energy described later.

The third spherical model data storage unit 108 stores data of the first spherical model after the process of the movement processing unit 107 and the process of the optimization processing unit 106, while the stored data of the first spherical model is results of the processes of the movement processing unit 107 and optimization processing unit 106.

The mapping processing unit 109 executes a process of mapping the hand model A to the hand model B based on the data of the hand model A stored in the first model data storage unit 101, the data of the hand model B stored in the second model data storage unit 102, data of the second spherical model stored in the second spherical model data storage unit 105, and the data of the first spherical model stored in the third spherical model data storage unit 108 and causes results of the mapping process to be stored in the third model data storage unit 110.

The label mapping unit 111 executes a process of setting, in the nodes of the hand model B, labels set in the nodes of the hand model A and causes results of the setting process to be stored in the fourth model data storage unit 112.

Next, details of processes to be executed by the mapping processing device 100 according to the embodiment are described with reference to FIGS. 13 to 30.

Figure 13:
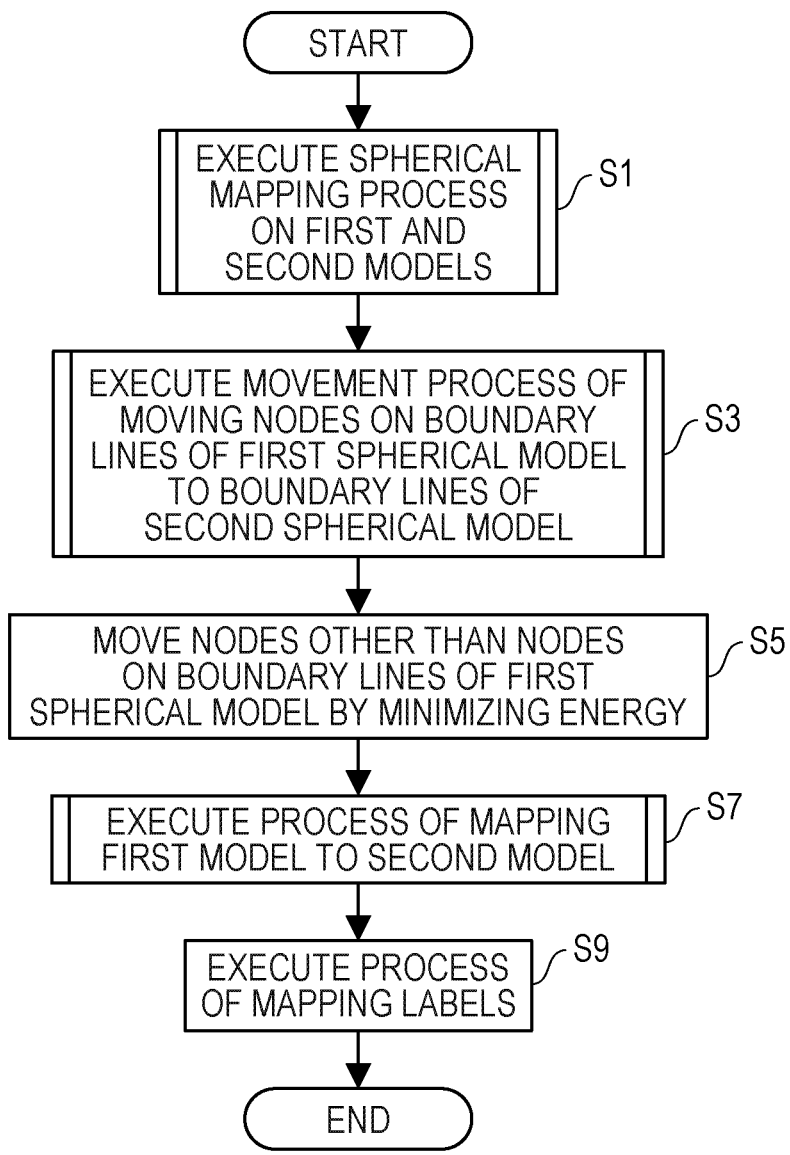
FIG. 13 is a flowchart of a main process according to the embodiment.

First, the spherical mapping processing unit 103 executes a spherical mapping process on the first and second models (hand models A and B), causes the data of the first spherical model (spherical model A) to be stored in the first spherical model data storage unit 104, and causes the data of the second spherical model (spherical model B) to be stored in the second spherical model data storage unit 105 (in step S1 illustrated in FIG. 13). The spherical mapping process is described below with reference to FIGS. 14 to 17. Although a case where the first spherical model (spherical model A) is generated is described below, the same spherical mapping process is executed on the second spherical model.

Figure 14:
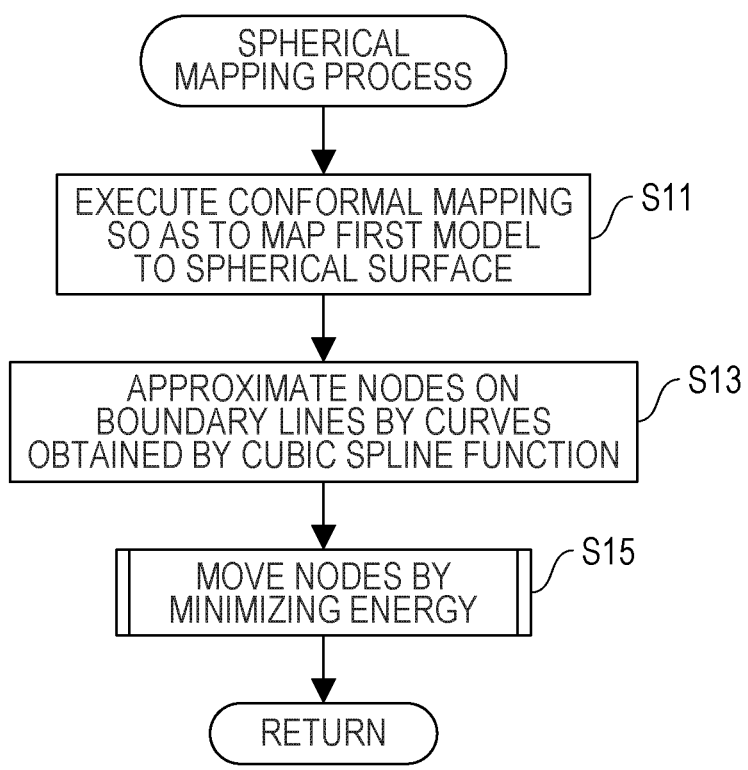
FIG. 14 is a flowchart of a spherical mapping process.
Figure 15:
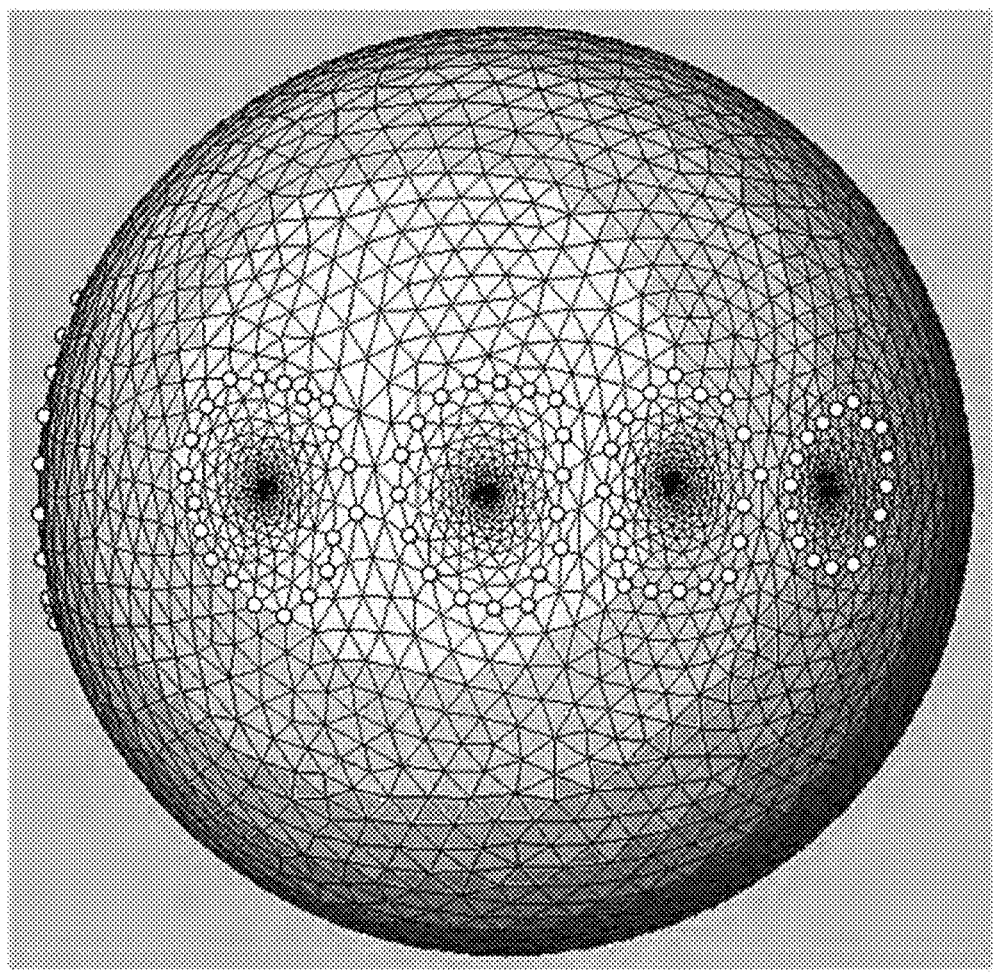
FIG. 15 is a diagram illustrating an example of an initial first spherical model.

The spherical mapping processing unit 103 executes conformal mapping so as to map the first model (hand model A) to a spherical surface with a radius 1 (in step S11 illustrated in FIG. 14). Since the conformal mapping is initial mapping, a conventional method may be used for the conformal mapping. For example, an initial spherical model A illustrated in FIG. 15 is obtained. White circles represent the nodes on the boundary lines between the finger region and the palm region.

Next, the spherical mapping processing unit 103 approximates the nodes on the boundary lines of the initial spherical model A by curves obtained by a three-dimensional spline function, for example (in step S13). Smooth curves other than the three-dimensional spline curves may be used. If the three-dimensional spline function is B(x) and the nodes on the boundary lines are $x_{k(j)}$, points $p_j$ on the curves are represented by $B(x_{k(j)})$. Then, the nodes $x_{k(j)}$ are moved to the points $p_j$.

The spherical mapping processing unit 103 causes the optimization processing unit 106 to execute a process of moving nodes by minimizing energy (in step S15). Then, the spherical mapping process returns to the original process illustrated in FIG. 13. The process of moving the nodes by minimizing the energy is described later with reference to FIGS. 16 and 17.

Before a specific description of the process, the energy according to the embodiment is described below.

It is assumed that $\Omega$ is a continuous region (surface) and parts obtained by discretizing $\Omega$ are triangular elements of a mesh M. The mesh M is formed of nodes, sides, and the triangular elements. Thus, M=(X, E, T), where X is a group of the nodes, E is a group of the sides, and T is a group of the triangular elements. A side e∈E represents two nodes connected to each other, while a triangular element t∈T each represents three nodes forming the triangular element.

In addition, it is assumed that indices of two nodes of an i-th side are represented by $\mu_i(1)$ and $\mu_i(2)$, and indices of three nodes of an i-th triangular element are represented by $\lambda_i(1)$, $\lambda_i(2)$, and $\lambda_i(3)$.

In the embodiment, the following energy is introduced in order to solve problems.

1. Energy that causes the surface $\Omega$ in a stable state to be a spherical surface $$E_s(x) = \alpha(V(x) - V_0)^2 + \beta \int_\Omega ds \quad (2)$$

$$x \in \Omega$$

In Equation (2), V(x) represents the volume of a part surrounding the surface $\Omega$, and $V_0$ represents the volume of a sphere with the radius 1. The energy that causes a bubble to be finally formed in a spherical shape is mathematically represented and minimizes the area of the surface while maintaining the volume at a certain level.

2. Energy that inhibits the triangular elements from being broken or deformed $$E_{tri}(M) = \sum_{i=1}^{m} \left[ \gamma \left( \frac{a(t_i)}{a'_i} - 1 \right)^2 s'_i \kappa \left( \frac{s(t_i)}{s'_i} - 1 \right)^2 s'_i \right] \quad (3)$$

In Equation (3), a(t) represents aspect ratios of the triangular elements t, s(t) represents the areas of the triangular elements t, $a'_i$ represents initial values (values before the movement of the nodes) of the aspect ratios, $s'_i$ represents initial values (values before the movement of the nodes) of the areas, and $\gamma$ and $\kappa$ represent coefficients.

In the embodiment, a sum of the two values of the energy is used. $E_{sd}(M)$ obtained by discretizing $E_s(M)$ expressed by Equation (2) is used. Specifically, E(M) is expressed as follows.

$$E(M) = E_{sd}(M) + E_{tri}(M) \quad (4)$$

$E_{sd}(M)$ is discretized by a method described below, and the equation that represents $E_{tri}(M)$ is deformed to obtain an equation of a node $x_i$.

Specifically, the aspect ratios of the triangular elements are expressed by Heron's formula as follows.

$$a(t_i) = \frac{|x_{\lambda_i(1)} - x_{\lambda_i(2)}||x_{\lambda_i(2)} - x_{\lambda_i(3)}||x_{\lambda_i(3)} - x_{\lambda_i(1)}|}{(l(t_i) - |x_{\lambda_i(1)} - x_{\lambda_i(2)}|)(l(t_i) - |x_{\lambda_i(2)} - x_{\lambda_i(3)}|)(l(t_i) - |x_{\lambda_i(3)} - x_{\lambda_i(1)}|)} \quad (5)$$

$$l(t_i) = \frac{1}{2}(|x_{\lambda_i(1)} - x_{\lambda_i(2)}| + |x_{\lambda_i(2)} - x_{\lambda_i(3)}| + |x_{\lambda_i(3)} - x_{\lambda_i(1)}|)$$

The areas of the triangular elements are expressed as follows.

$$s(t_i) = \frac{1}{2}|(x_{\lambda_i(2)} - x_{\lambda_i(1)}) \times (x_{\lambda_i(3)} - x_{\lambda_i(1)})| \quad (6)$$

In addition, the volume is expressed by divergence theorem of Gauss as follows.

$$V(x) = \int_\Omega dV \quad (7)$$

$$= \frac{1}{3} \int_\Omega div\, x\, dV$$

$$= \frac{1}{3} \int_S x \cdot n(x)\, dS$$

$$x \in \Omega$$

In Equation (7), n(x) represents a normal. In addition, $V_d$ obtained by discretizing the volume by a finite element method is expressed as follows.

$$V_d(M) = \frac{1}{6}\sum_{i=1}^{m} x_{\lambda_i(1)} \cdot (x_{\lambda_i(2)} \times x_{\lambda_i(3)}) \quad (8)$$

Based on the aforementioned equations, Equation (4) is expressed as follows.

$$E_d(M) = \alpha\left(\frac{1}{6}\sum_{i=1}^{m} x_{\lambda_i(1)}(x_{\lambda_i(2)} \times x_{\lambda_i(2)}) - V_0\right)^2 + \beta\frac{1}{2}\sum_{i=1}^{m} |(x_{\lambda_i(2)} - x_{\lambda_i(1)}) \times (x_{\lambda_i(3)} - x_{\lambda_i(1)})| +$$

$$\gamma\sum_{i=1}^{m}\left(\frac{1}{a_i'}\frac{|x_{\lambda_i(1)} - x_{\lambda_i(2)}| \cdot |x_{\lambda_i(2)} - x_{\lambda_i(3)}| \cdot |x_{\lambda_i(3)} - x_{\lambda_i(1)}|}{(l(t_i) - |x_{\lambda_i(1)} - x_{\lambda_i(2)}|)(l(t_i) - |x_{\lambda_i(2)} - x_{\lambda_i(3)}|)(l(t_i) - |x_{\lambda_i(3)} - x_{\lambda_i(1)}|)} - 1\right)^2 s_i' +$$

$$\kappa\sum_{i=1}^{m}\left(\frac{1}{s_i'}|(x_{\lambda_i(2)} - x_{\lambda_i(1)}) \times (x_{\lambda_i(3)} - x_{\lambda_i(1)})| - 1\right)^2 s_i' \quad (9)$$

In the embodiment, Equation (9) is used as the energy to be minimized. By using the energy, problems such as a reversed part and a twisted part, which occur in the spring model, do not occur.

Next, a flowchart of the process of moving the nodes by minimizing the energy is described with reference to FIG. 16.

Figure 16:
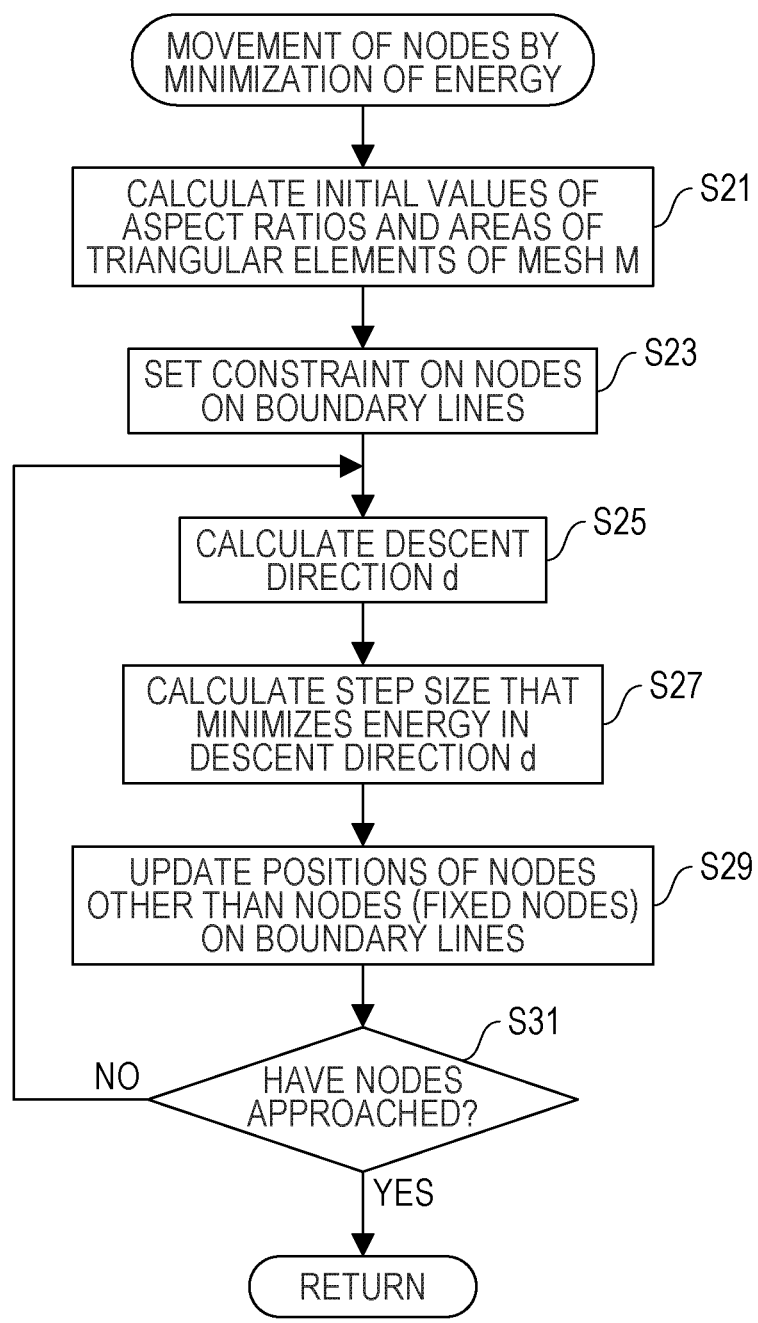
FIG. 16 is a flowchart of a process of moving nodes by minimizing energy.

First, the optimization processing unit 106 that receives an instruction to execute the process from the spherical mapping processing unit 103 calculates the initial values $a'_i$ of the aspect ratios of the triangular elements of the mesh M on the spherical surface and the initial values $s'_i$ of the areas of the triangular elements of the mesh M on the spherical surface (in step S21 illustrated in FIG. 16).

The optimization processing unit 106 sets a constraint that the nodes $x_{k(j)}$ on the boundary lines are fixed to the points $P_j$ on the approximate curves (in step S23).

Then, the optimization processing unit 106 calculates a descent direction d (vector) (in step S25). Specifically, the optimization processing unit 106 solves the following equation using a steepest descent method.

$$d = -\nabla E_d(X) \quad (10)$$

The optimization processing unit 106 calculates a step size $\alpha^*$ that minimizes the energy $E_d(M)$ in the descent direction d (in step S27).

The optimization processing unit 106 solves the following equation using golden ratio division.

$$\alpha^* = \arg\min_{\alpha} Ed(X + \alpha d) \quad (11)$$

Then, the optimization processing unit 106 updates the positions of nodes other than the nodes (or fixed points) on the boundary lines (in step S29).

Specifically, the optimization processing unit 106 updates the positions of the nodes based on an equation of $(x_i = x_i + \alpha^* d_i)$ for $x_i$ other than $x_{k(j)}$.

The optimization processing unit 106 determines whether or not the nodes have approached due to the movement (in step S31). For example, the optimization processing unit 106 determines whether or not a sum of distances between the previous positions of the nodes and the current positions of the nodes becomes equal to a predetermined value (of, for example, $1^{-10}$).

If the optimization processing unit 106 determines that the nodes have not approached, the process returns to step S25. On the other hand, if the optimization processing unit 106 determines that the nodes have approached, the process returns to the original process illustrated in FIG. 13.

In step S15, results of the process of step S15 are output to the spherical mapping processing unit 103, and the spherical mapping processing unit 103 causes the results of the process executed on the first model (hand model A) to be stored in the first spherical model data storage unit 104 or causes results of the process executed on the second model (hand model B) to be stored in the second spherical model data storage unit 105.

Figure 17:
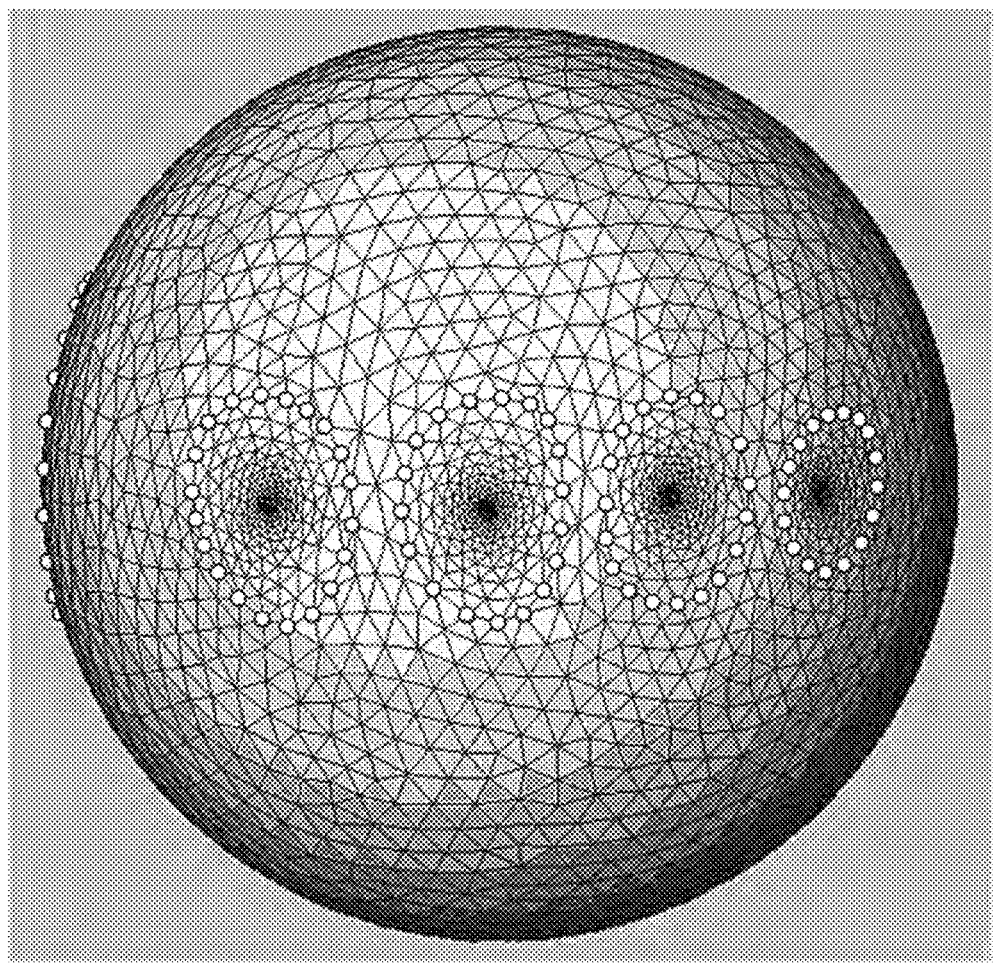
FIG. 17 is a diagram illustrating an example of a first spherical model after the spherical mapping process.

For example, if the aforementioned process is executed on the spherical model A illustrated in FIG. 15, the spherical model A is changed to a state illustrated in FIG. 17. Thus, initial triangular elements of the mesh in which a reversed part does not exist are formed on the spherical model A.

Returning to the process illustrated in FIG. 13, the movement processing unit 107 uses the data stored in the first and second spherical model data storage units 104 and 105 to execute the process of moving the nodes on the boundary lines of the first spherical model (spherical model A) to the boundary lines of the second spherical model (spherical model B) (in step S3). The movement process is described below with reference to FIGS. 18 to 23.

Figure 18:
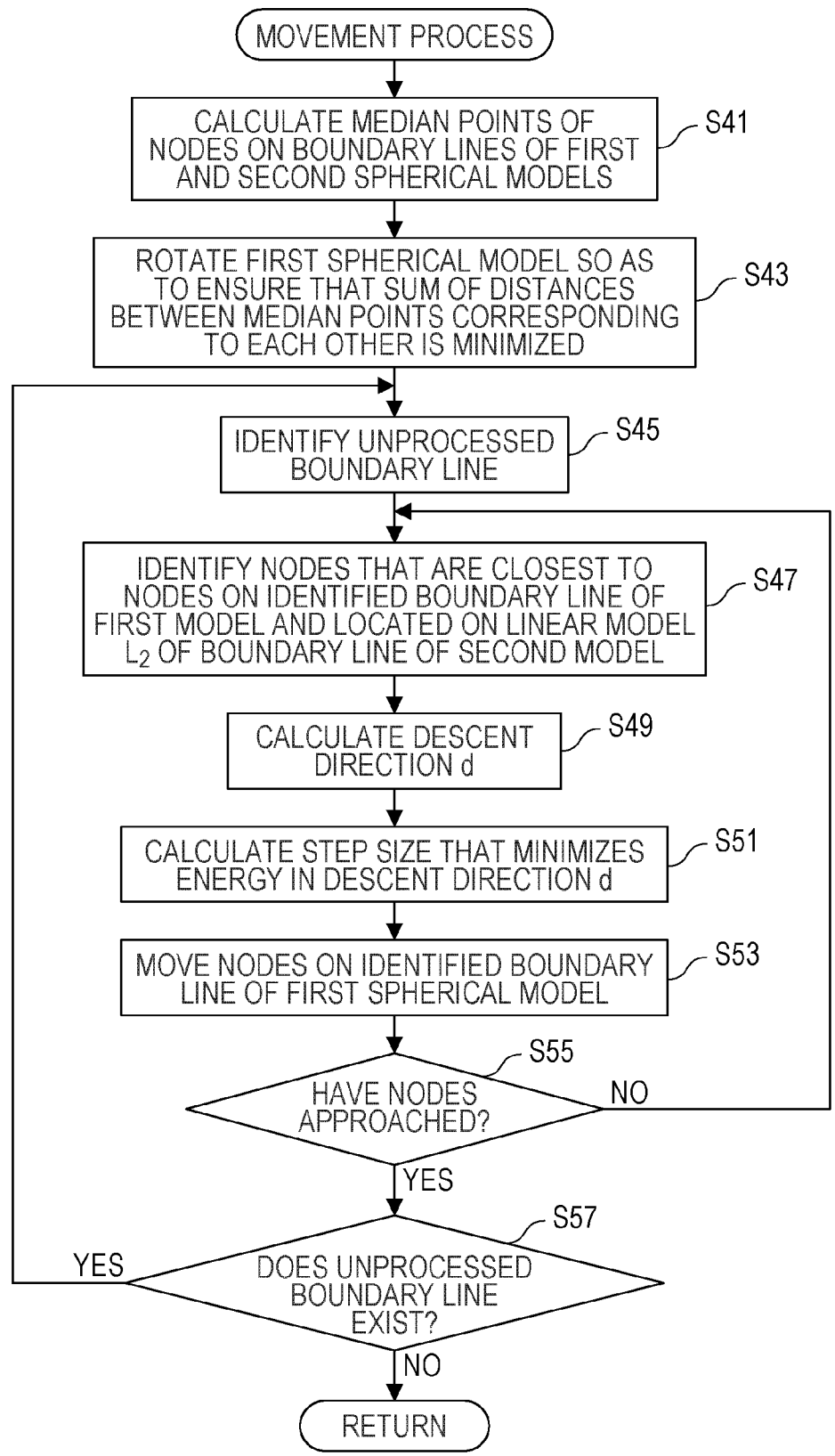
FIG. 18 is a flowchart of a process of a movement process.
Figure 19:
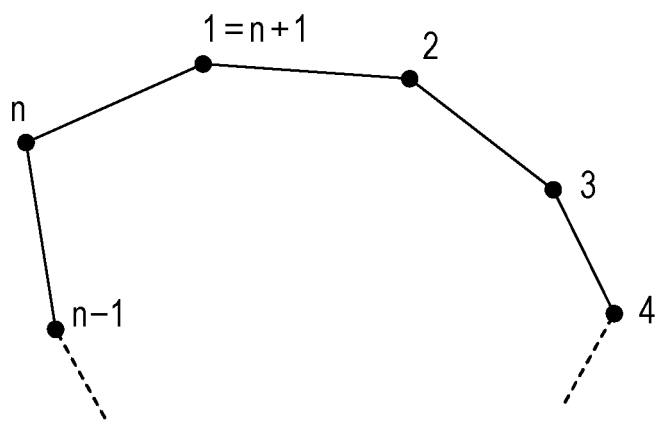
FIG. 19 is a diagram describing relationships between nodes of a linear model.

First, the movement processing unit 107 calculates a median point (or a center of gravity) of nodes on each of the boundary lines of the first and second spherical models (in step S41 illustrated in FIG. 18).

Then, the movement processing unit 107 rotates the first spherical model so as to minimize a sum of distances between the median points calculated for the boundary lines of the first spherical model and the median points calculated for the corresponding lines of the second spherical model (in step S43). The rotation causes regions included in the first and second spherical models and corresponding to each other to approach each other and enables the following process to be appropriately executed.

After that, the movement processing unit 107 identifies an unprocessed boundary line of the first spherical model after the rotation (in step S45). Then, the movement processing unit 107 identifies nodes that are closest to nodes on the boundary line identified from the first spherical model and are located on a linear model $L_2$ of a boundary line, corresponding to the identified boundary line, of the second spherical model (in step S47).

A linear model is represented by L=(X, E). The linear model is a model obtained by discretizing a curve formed of a group X of nodes and a group E of sides each connecting two nodes to each other. The linear model L that is formed of a number n of nodes is expressed as follows.

$$L=(\{x_i\}_{i=1,\ldots,n}, \{e_i=(x_i,x_{i+1})\}_{i=1,\ldots,n}) \quad (12)$$

In addition, $x^{init}_i$ represents an initial position of a node of a linear model $L_1$. Since the boundary line is a closed loop, an n+1-th node is the same as a first node.

In addition, dist(x, L) represents the minimum distance between nodes x and the linear model L, and $p_i$ represents points that are closest to nodes $x_{L1, i}$ and located on the linear model $L_2$. A process of identifying the closest nodes is described with reference to FIG. 20.

Figure 20:
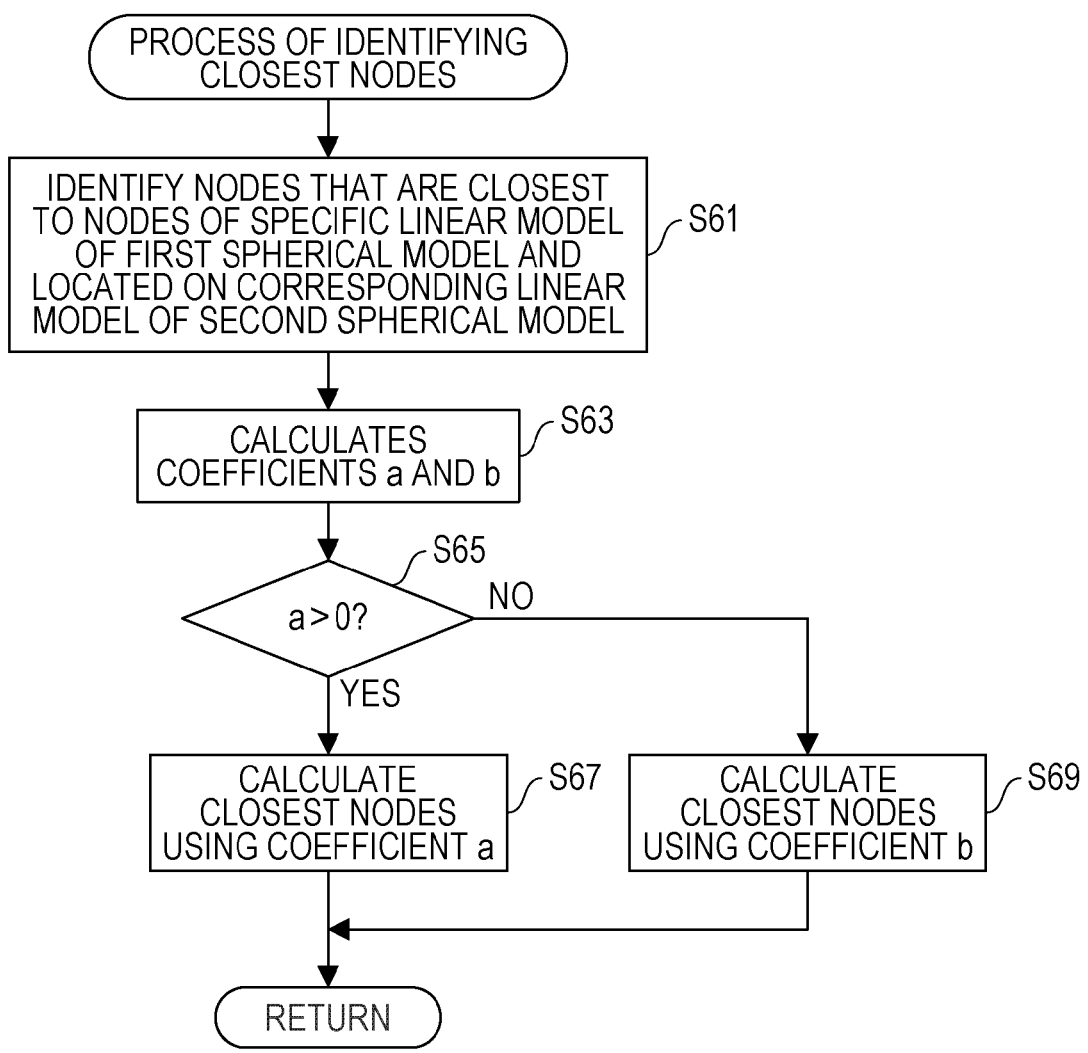
FIG. 20 is a flowchart of a process of identifying closest nodes.

First, the movement processing unit 107 identifies nodes $x_{L2, id}$ that are closest to the nodes $x_{L1, i}$ of the specific linear model $L_1$ of the first spherical model and located on the corresponding linear model $L_2$ of the second spherical model (in step S61 illustrated in FIG. 20). Specifically, the movement processing unit 107 identifies the following nodes $x_{L2, id}$.

$$id = \arg\min_j |x_{L1,i} - x_{L2,j}| \quad (13)$$

Then, the movement processing unit 107 calculates coefficients a and b as follows (in step S63).

$$a = \frac{(x_{L2,id+1} - x_{L2,id})}{|x_{L2,id+1} - x_{L2,id}|} \cdot (x_{L1,i} - x_{L2,id}) \quad (14)$$

$$b = \frac{(x_{L2,id-1} - x_{L2,id})}{|x_{L2,id-1} - x_{L2,id}|} \cdot (x_{L1,i} - x_{L2,id})$$

Then, the movement processing unit 107 determines whether or not a>0 (in step S65). If a>0, the movement processing unit 107 uses the coefficient a to calculate the points $p_i$ closest to the nodes $x_{L1, i}$ as follows (in step S67).

$$p_i = a(X_{L1,i} - X_{L2,id}) + X_{L2,id} \quad (15)$$

On the other hand, if a≤0, the movement processing unit 107 uses the coefficient b to calculate the points $p_i$ closest to the nodes $x_{L1, i}$ as follows (in step S69). Then, the process returns to the original process illustrated in FIG. 13.

$$p_i = b(X_{L1,id-1} - X_{L2,id}) + X_{L2,id} \quad (16)$$

Figure 21:
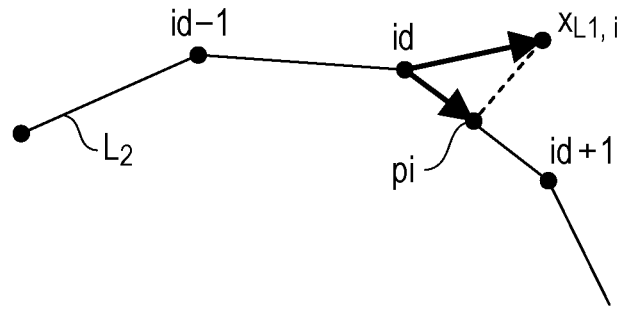
FIG. 21 is a diagram describing the closest nodes.

In step S67, the nodes $x_{L1, i}$ exist between the nodes $x_{L2, id}$ and $x_{L2, id+1}$, and the points $p_i$ are obtained based on the aforementioned calculation by projecting $x_{L1, i}$ on the model line $L_2$ as illustrated in FIG. 21.

Figure 22:
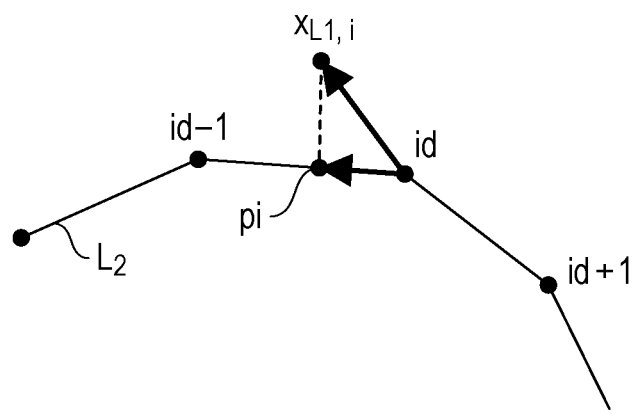
FIG. 22 is a diagram describing the closest nodes.

In step S69, the nodes $x_{L1, i}$ exist between the nodes $x_{L2, id-1}$ and $x_{L2, id}$, and the points $p_i$ are obtained based on the aforementioned calculation by projecting $x_{L1, i}$ on the model line $L_2$ as illustrated in FIG. 22.

In step S47, the points $p_i$ that are closest to the nodes $x_{L1, i}$ (n=1, . . . , n) are identified.

Then, the following energy $E_L$ is minimized.

$$E_L(X_{L1}, \{p\}) = \frac{1}{2} \sum_{i=1}^{n_1-1} \left( \frac{|x_{L1,i} - x_{L1,i+1}|}{l'_i} - 1 \right)^2 l'_i + \quad (17)$$

$$\frac{1}{2}\left(\frac{|x_{L1,n} - x_{L1,0}|}{l'_{n_1}} - 1\right)^2 l'_{n_1} + \frac{1}{2}\alpha \sum_{i=1}^{n_1} |x_{L1,i} - p_i|^2$$

$$l'_i = \frac{\sum_{k=1}^{n_1-1} |x_{L1,k} - x_{L1,k+1}| + |x_{L1,n} - x_{L1,0}|}{\sum_{k=1}^{n_2-1} |x_{init,k} - x_{init,k+1}| + |x_{init,n} - x_{init,0}|} |x_{init,i} - x_{init,i+1}| \quad (18)$$

In Equations (17) and (18), a is a predetermined coefficient that is significantly larger than 1, $n_1$ is the number of nodes on the linear model $L_1$, and $n_2$ is the number of nodes on the linear model $L_2$.

In Equations (17) and (18), $l'_i$ represents a value of ((the length of $L_2$)×(the length of a side element located on $L_1$ and extending from a node $x_i$ as a start point)/(the length of $L_1$)). Specifically, $l'_i$ represents the length of the side element extending from the node $x_i$ as the start point and located on the linear model $L_1$ when the linear model $L_1$ is moved to the linear model $L_2$, while the following relationship exists.

$$\sum_{i=1}^{n_1} l'_i = \sum_{k=1}^{n_2-1} |x_{L2,k} - x_{L2,k+1}| + |x_{L2,n_2} - x_{L2,0}| \quad (19)$$

$$= \text{the length of } L_2$$

The first and second items of Equation (17) represent energy to be used to maintain ratios of the lengths of initial side elements of the linear model $L_1$, while the third item of Equation (17) represents energy corresponding to distances from the linear model $L_2$.

Then, the movement processing unit 107 calculates a descent direction d (vector) (in step S49). Specifically, the movement processing unit 107 solves the following equation by the steep descent method, for example.

$$d = -\nabla E_L(X_{L1}, \{p\}) \quad (20)$$

The movement processing unit 107 calculates a step size α* that minimizes the energy $E_L$ in the descent direction d (in step S51).

The movement processing unit 107 solves the following equation using golden ratio division.

$$\alpha^* = \arg\min_\alpha E_L(X_{L1} + \alpha d, \{p\}) \quad (21)$$

Then, the movement processing unit 107 updates the positions of the nodes on the identified boundary line of the first spherical model (in step S53).

Specifically, the movement processing unit 107 updates the positions of the nodes based on an equation of ($X_{L1} = X_{L1} + \alpha^* d$). Data of the updated positions of the nodes and data of the other nodes are stored in the third spherical model data storage unit 108.

The movement processing unit 107 determines whether or not the nodes have approached due to the movement (in step S55). For example, the movement processing unit 107 determines whether or not a sum of distances between the previous positions of the nodes and the current positions of the nodes becomes equal to a predetermined value (of, for example, $1^{-10}$).

If the movement processing unit 107 determines that the nodes have not approached, the process returns to step S47. On the other hand, if the movement processing unit 107 determines that the nodes have approached, the movement processing unit 107 determines whether or not an unprocessed boundary line exists (in step S57). If the unprocessed boundary line exists, the process returns to step S45. On the other hand, if the unprocessed boundary line does not exist, the process returns to the original process illustrated in FIG. 13.

Figure 23:
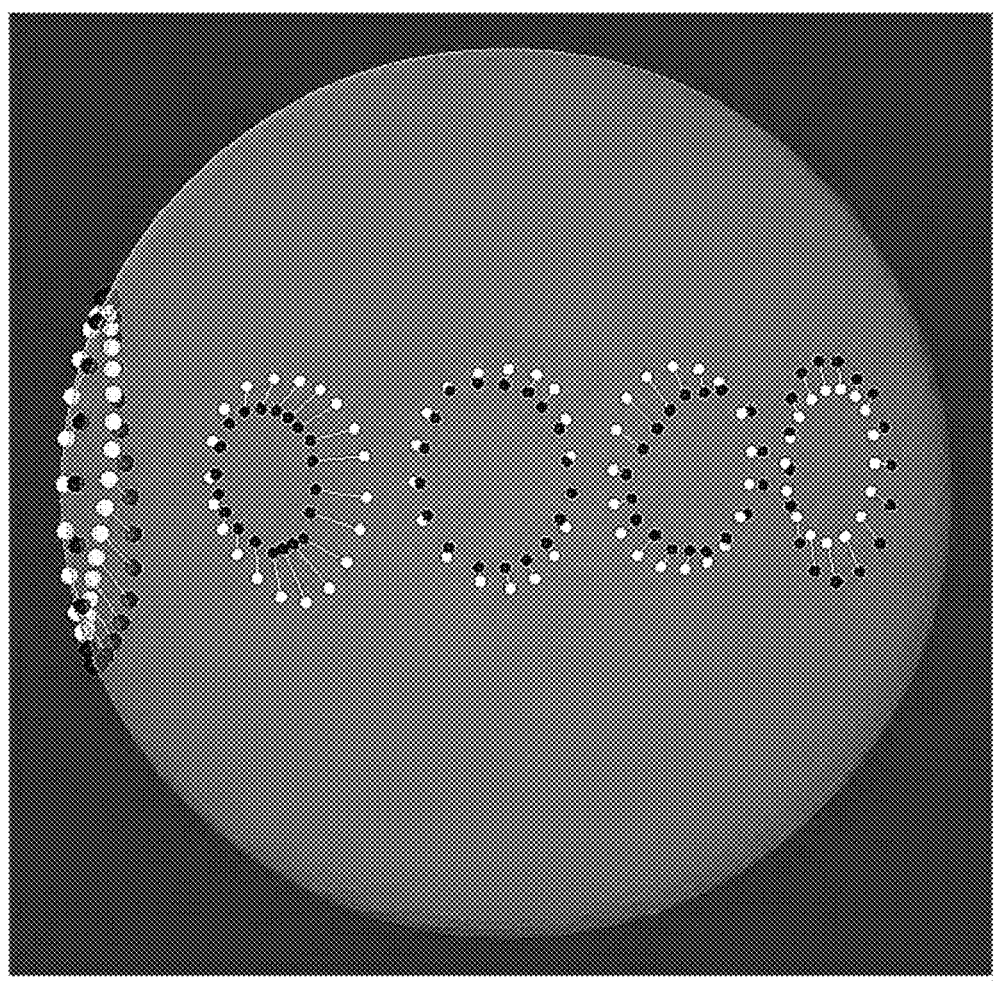
FIG. 23 is a diagram associations of nodes on boundary lines of the first spherical model with closest nodes on boundary lines of the second spherical model.
Figure 24:
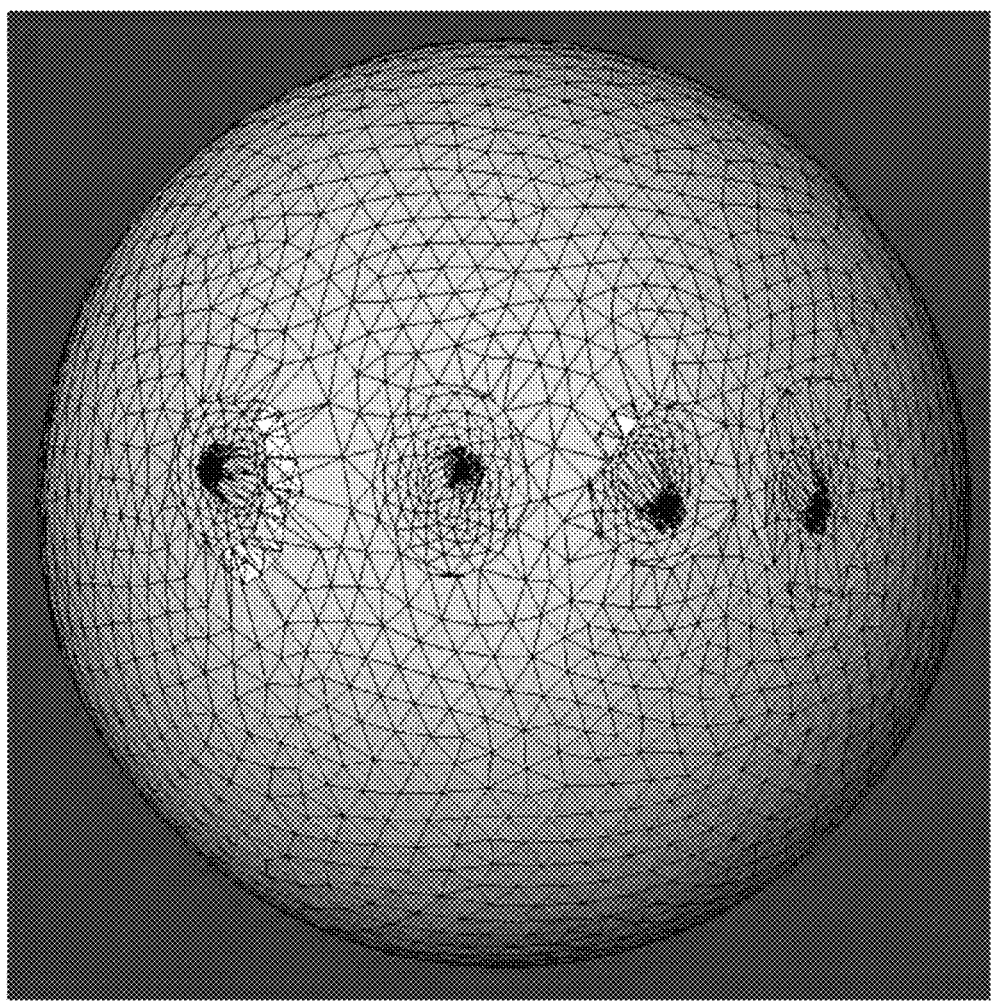
FIG. 24 is a diagram illustrating the first spherical model in a state in which only the nodes on the boundary lines are moved.

By executing the aforementioned process, the nodes (closest nodes on the boundary line of the second spherical model, or black points) to which the nodes (white points) on the boundary line of the first spherical model are moved are obtained as illustrated in FIG. 23.

Returns to the description of the process illustrated in FIG. 13. The optimization processing unit 106 moves the nodes other than the nodes on the boundary lines of the first spherical model by minimizing the energy (in step S5). The process illustrated in FIG. 16 is executed on the nodes on the boundary lines of the first spherical model after the nodes on the boundary lines of the first spherical model are fixed to the destination nodes identified in step S3. In the process illustrated in FIG. 16, the energy $E_d(M)$ according to the embodiment is used, and an inappropriate triangular element such as a reversed part or the like is not generated.

In the process illustrated in FIG. 16, the nodes of the triangular elements having a predetermined area or less may be treated as fixed nodes and may not be moved. This avoids placing the nodes outside the spherical surface.

Figure 25:
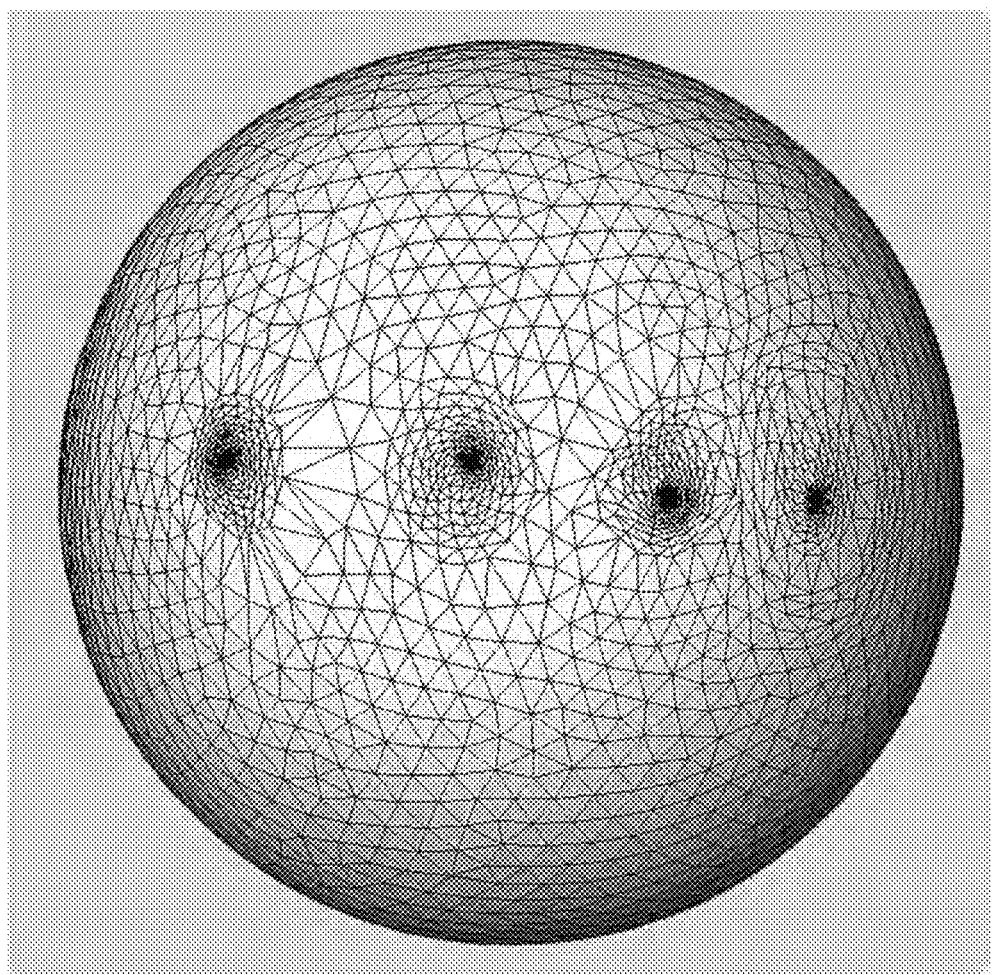
FIG. 25 is a diagram illustrating the first spherical model in a state in which nodes other than the nodes located on the boundary lines are moved after the state illustrated in FIG. 24.

When step S5 is executed, the data of the first spherical model is stored in the third spherical model data storage unit 108. Then, if only the nodes on the boundary lines of the first spherical model illustrated in FIG. 15 are moved, the first spherical model becomes a state illustrated in FIG. 24. When step S5 is executed, the spherical model that does not include a reversed part and a twisted part is obtained as illustrated in FIG. 25.

After that, the mapping processing unit 109 executes a process of mapping the first model (hand model A) to the second model (hand model B) (in step S7). The mapping process is described with reference to FIGS. 26 to 28.

Figure 26:
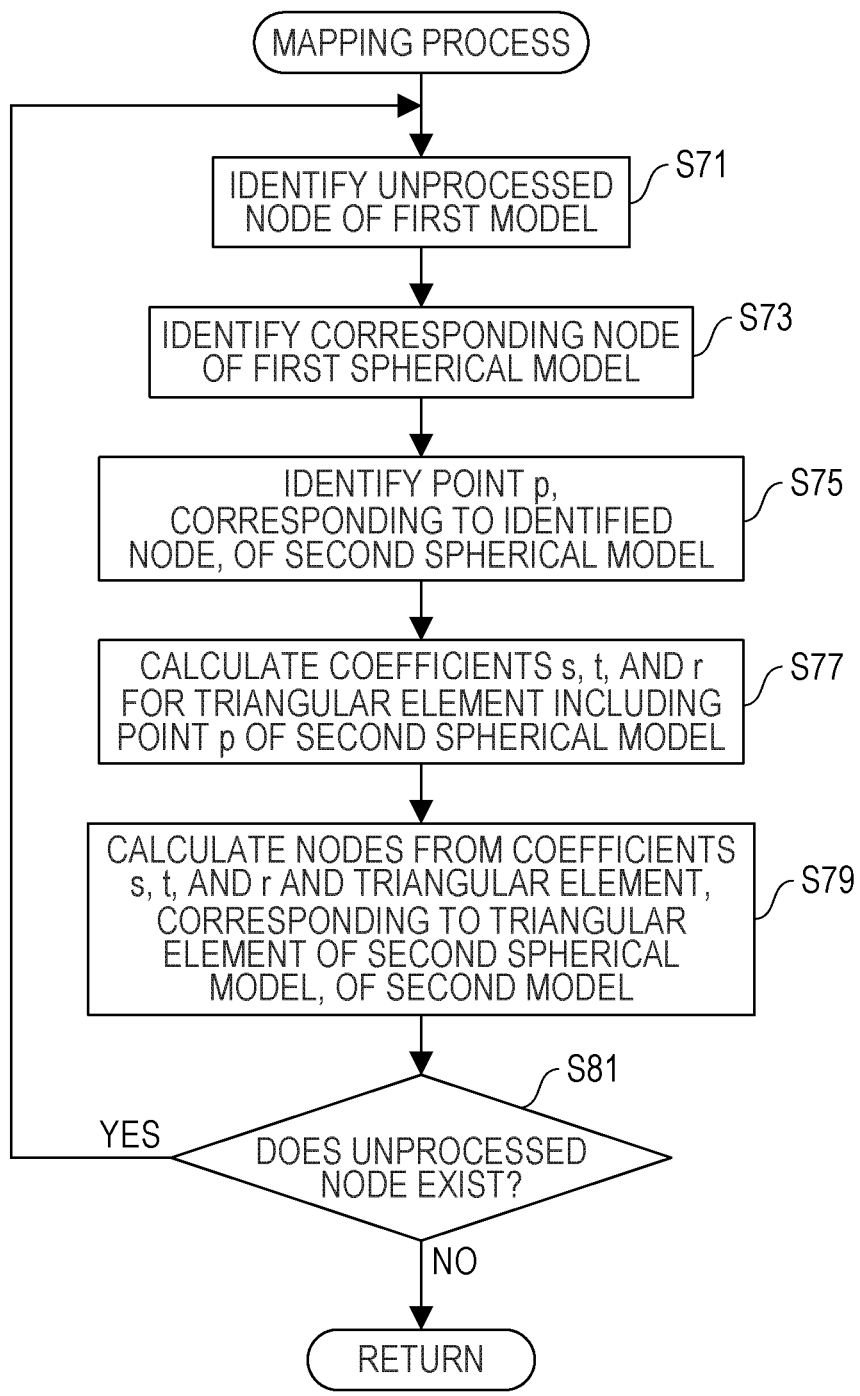
FIG. 26 is a flowchart of a mapping process.

First, the mapping processing unit 109 identifies one of unprocessed nodes $x_i^{handA}$ of the first model (hand model A) stored in the first model data storage unit 101 (in step S71 illustrated in FIG. 26). In addition, the mapping processing unit 109 identifies a node $x_i^{sphereA}$, corresponding to the identified node $x_i^{handA}$, of the first spherical model stored in the third spherical model data storage unit 108 (in step S73).

Furthermore, the mapping processing unit 109 identifies a point p corresponding to the identified node $x_i^{sphereA}$ and located on the second spherical model (spherical model B) (in step S75). Then, the mapping processing unit 109 calculates coefficients s, t, and r for a triangular element including the point p of the second spherical model (spherical model B) (in step S77).

Figure 27:
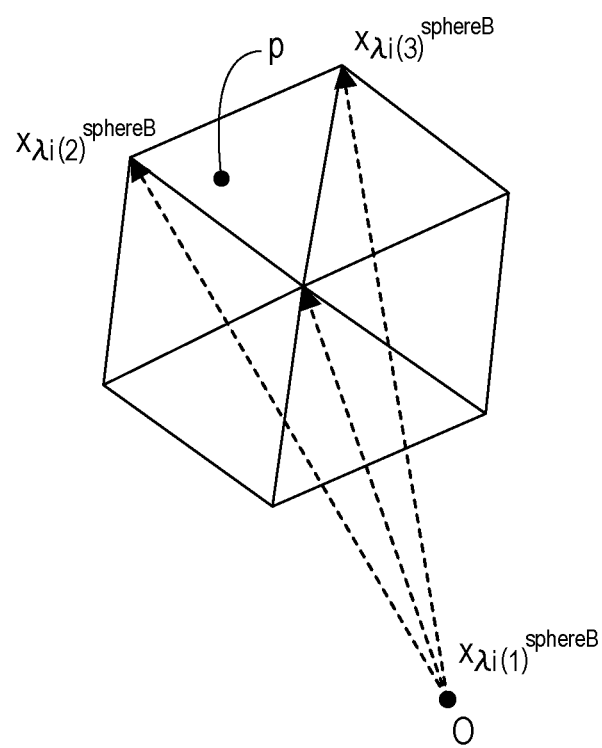
FIG. 27 is a diagram illustrating relationships between triangular elements of the second spherical model and a point corresponding to a node of the first model.

As illustrated in FIG. 27, the point p is expressed using corners $x_{\lambda i(1)}^{sphereB}$, $x_{\lambda i(2)}^{sphereB}$, and $x_{\lambda i(3)}^{sphereB}$ of the triangular element including the point p as follows.

$$p = sx_{\lambda i(1)}^{sphereB} + tx_{\lambda i(2)}^{sphereB} + rx_{\lambda i(3)}^{sphereB} \quad (22)$$

The mapping processing unit 109 calculates the coefficients s, t, and r. Note that s+t+r=1.

Then, the mapping processing unit 109 identifies a triangular element corresponding to the triangular element of the second spherical model and included in the second model (hand model B), calculates a point p' corresponding to the point p and included in the second model from the identified triangular element and the coefficients s, t, and r, and causes the calculated point p' to be stored in the third model data storage unit 110 (in step S79).

Since it is apparent from $\lambda i(1)$, $\lambda i(2)$, and $\lambda i(3)$ that points of the corresponding triangular element of the second model (hand model B) are $x_{\lambda i(1)}^{handB}$, $x_{\lambda i(2)}^{handB}$, and $x_{\lambda i(3)}^{handB}$, the mapping processing unit 109 calculates the corresponding point p' of the second model using the following equation.

$$p' = sx_{\lambda i(1)}^{handB} + tx_{\lambda i(2)}^{handB} + rx_{\lambda i(3)}^{handB} \quad (23)$$

Then, the mapping processing unit 109 determines whether or not an unprocessed node exists in the first model (in step S81). If the unprocessed node exists, the process returns to step S71. If the unprocessed node does not exist, the process returns to the original process illustrated in FIG. 13.

Figure 28:
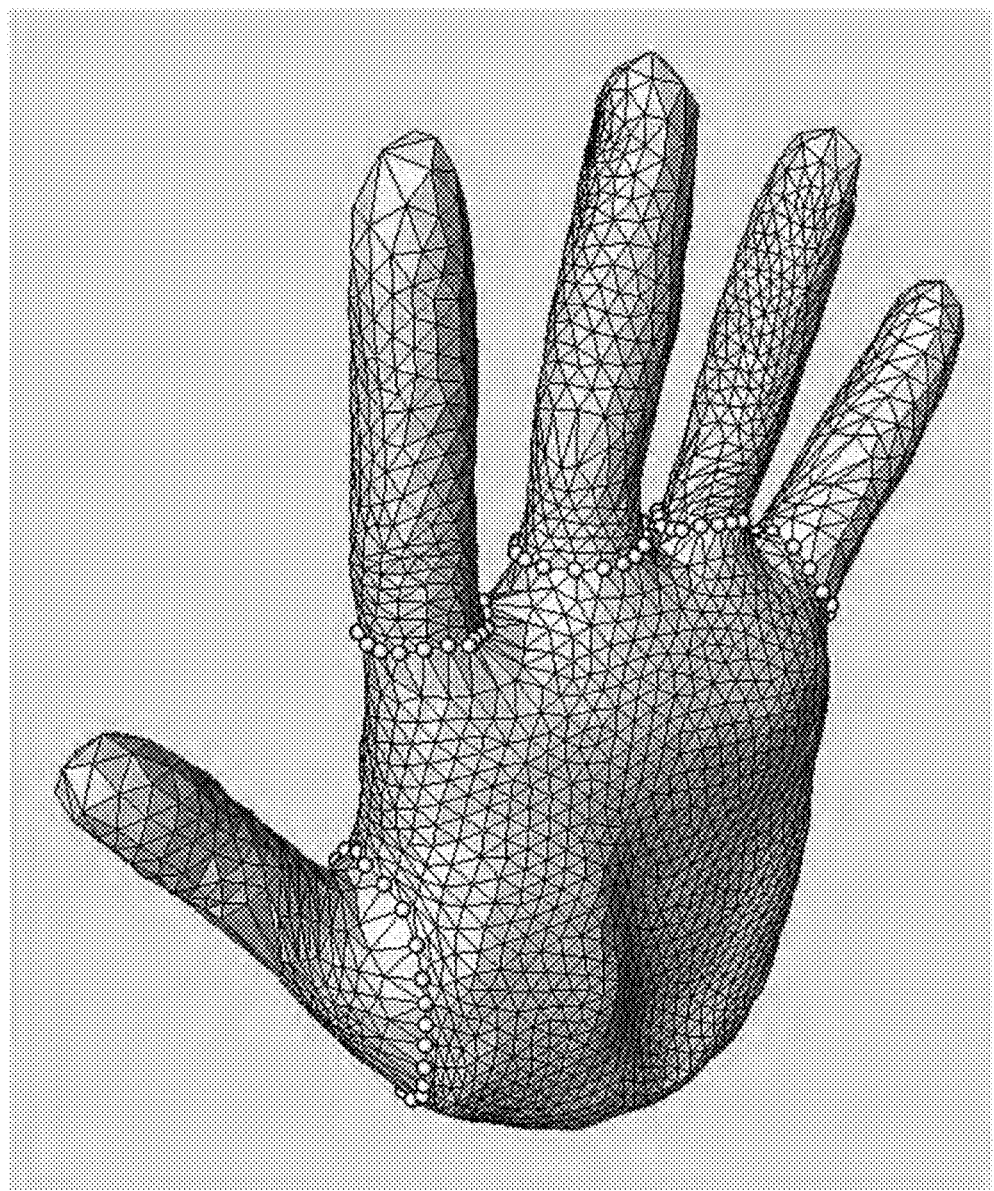
FIG. 28 is a diagram illustrating the first model mapped to the second model.

The aforementioned process is executed so as to map the hand model A illustrated in FIG. 11 to the hand model B illustrated in FIG. 12 and thereby obtain a hand model C illustrated in FIG. 28.

As illustrated in FIG. 1, the labels (each representing the finger region or the palm region) are set in the nodes of the hand model A as attributes. If the hand A and the labels are to be mapped, the label mapping unit 111 executes a process of mapping the labels and causes results of the process to be stored in the fourth model data storage unit 112 (in step S9). Then, the process is terminated.

Figure 29:
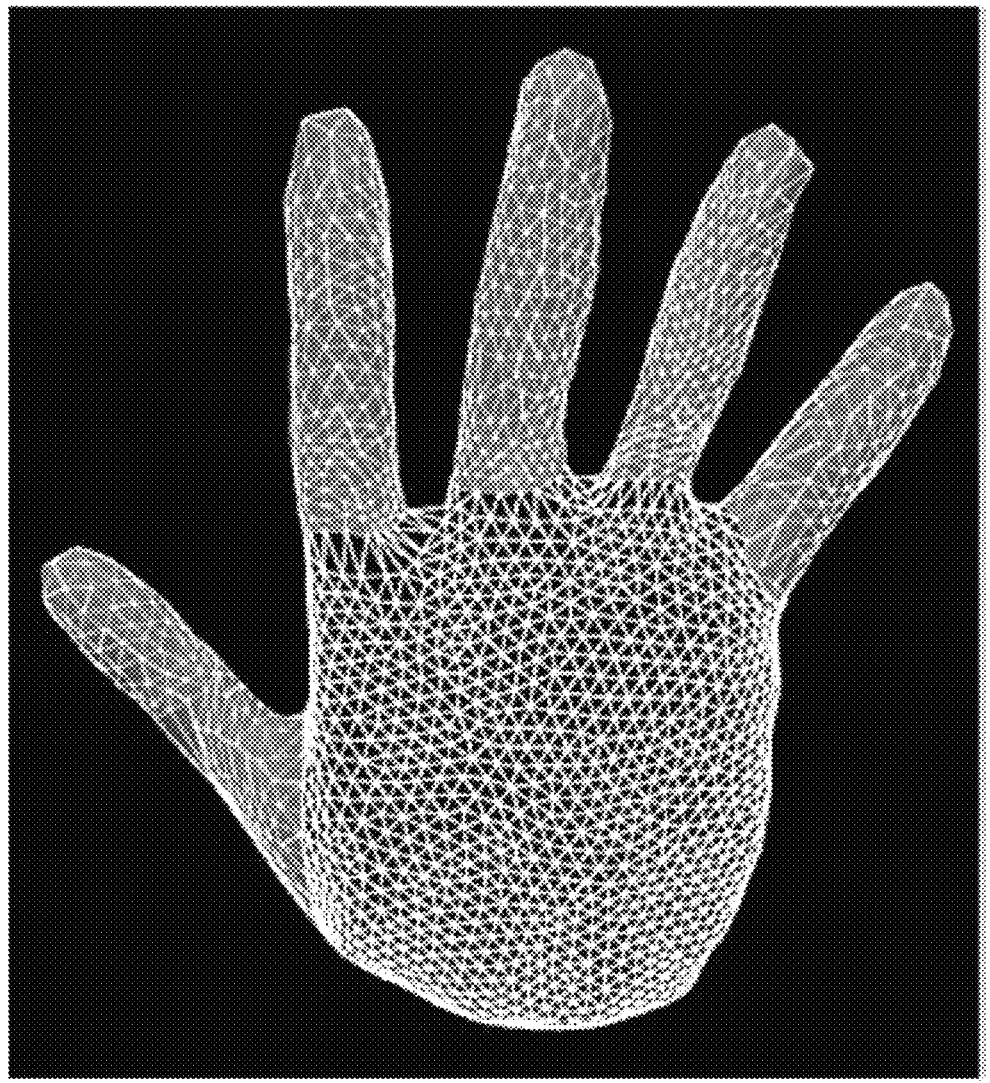
FIG. 29 is a diagram illustrating a state in which labels are set to the first model mapped to the second model.
Figure 30:
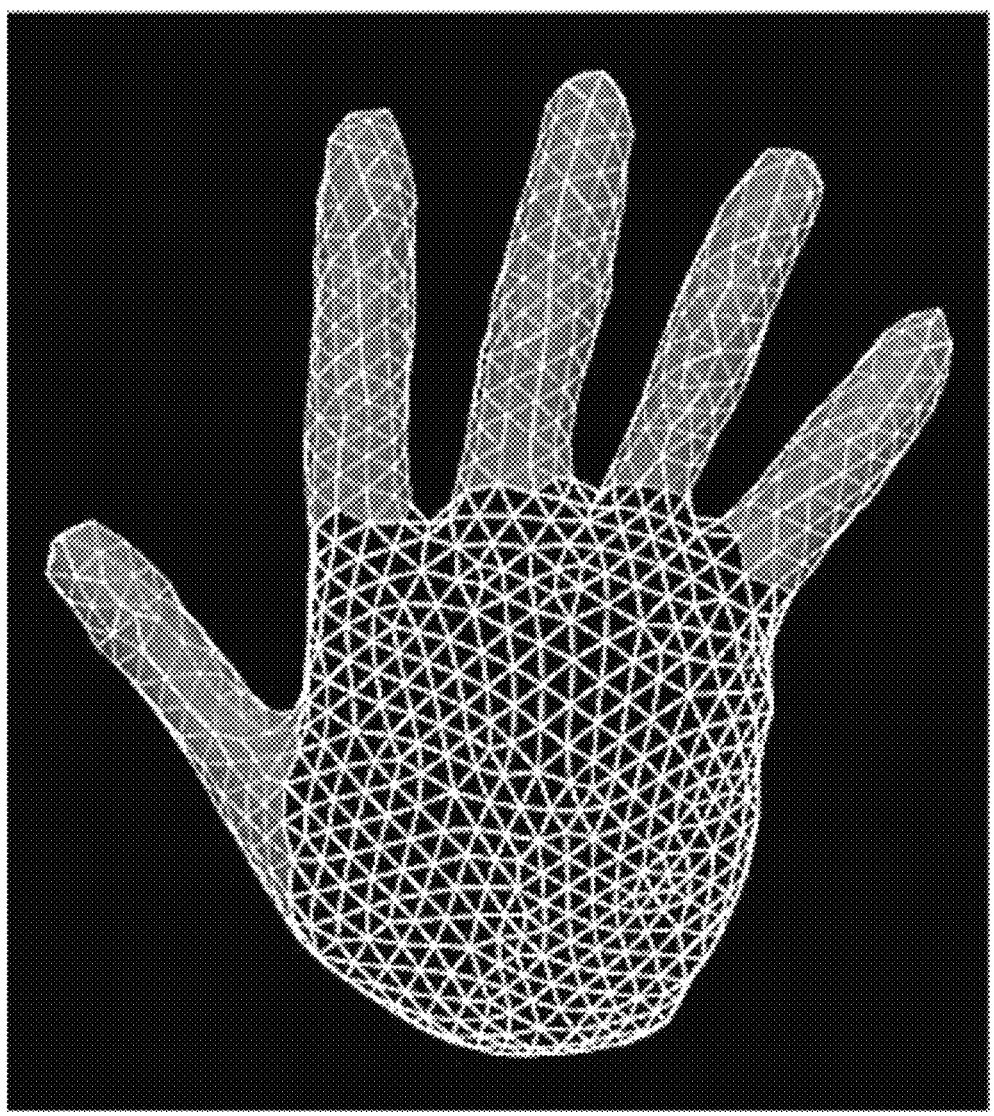
FIG. 30 is a diagram illustrating results of mapping labels to the second model.

In the process of mapping the labels, if palm labels and finger labels are set in the nodes of the hand model A as illustrated in FIG. 1, the labels are mapped to the hand model C by the processes up to step S7 without any change, as illustrated in FIG. 29. Thus, the mapping processing unit 109 identifies a triangular element corresponding to nodes of the hand model C and included in the hand model B and maps, to the triangular element, labels mapped to the nodes of the hand model C. By executing the aforementioned mapping process, results of the process of mapping the labels to the hand model C are obtained as illustrated in FIG. 30. If the hand model B does not have label information, the labels may be mapped in the aforementioned manner. A difference between parts located near roots of the thumbs of the hand models B and C illustrated in FIGS. 2 and 30 appears.

By executing the aforementioned process, bijective mapping may be executed without a reversed part and a twisted part.

Although the embodiment is described above, the disclosure is not limited to the embodiment. For example, other known methods may be used for algorithms used by the optimization processing unit 106 and the like.

The functional blocks illustrated in FIG. 10 may not match a program module configuration. In addition, as long as the process results do not change, the order of the aforementioned steps may be changed, and at least two of the aforementioned steps may be executed in parallel.

Instead of the triangular mesh elements, other polygonal mesh elements may be used.

In addition, although the example in which the single mapping processing device 100 executes the processes is described above, the functions of the mapping processing device 100 may be distributed to a plurality of computers. Furthermore, the functions may be included in a client server system. The data stored in the data storage units may be displayed by a display device of the mapping processing device 100 and transmitted to another computer.

Figure 31:
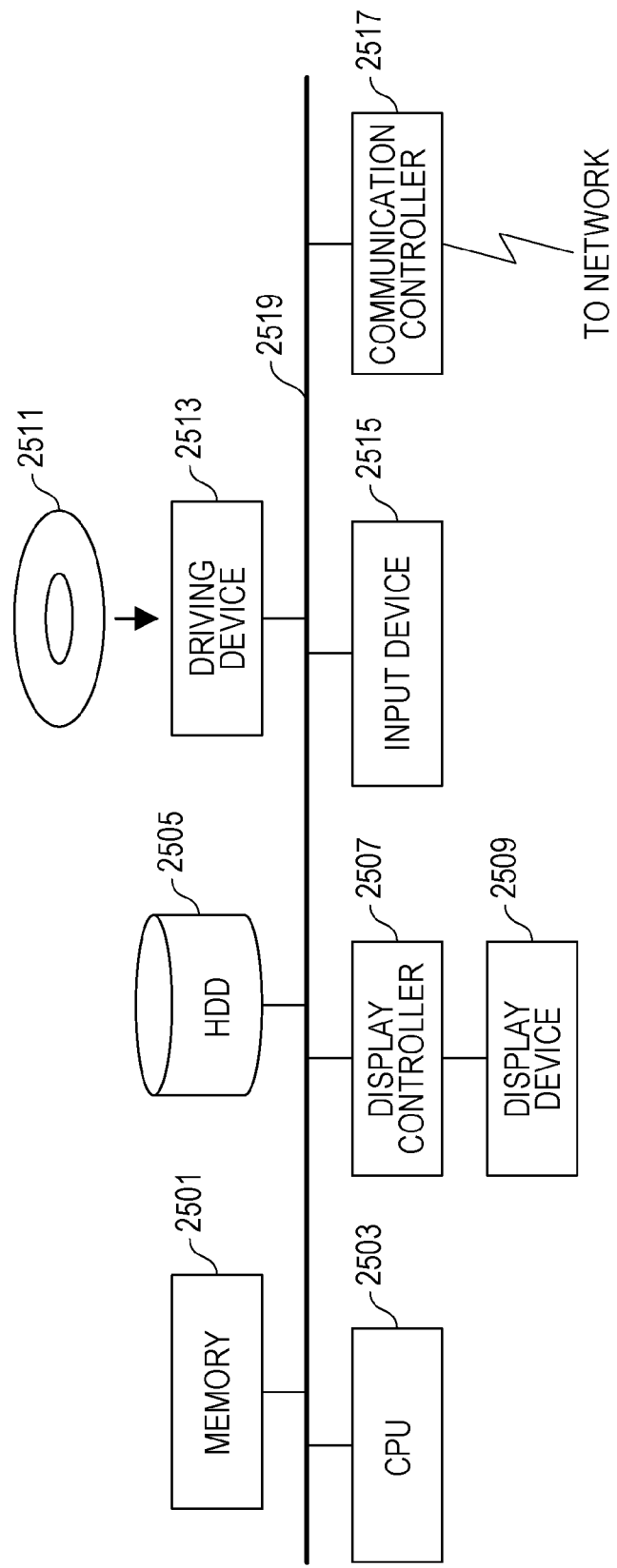
FIG. 31 is a functional block diagram of a computer.

The aforementioned mapping processing device 100 is a computer device. In the mapping processing device 100, a memory 2501, a central processing unit 2503, a hard disk drive (HDD) 2505, a display controller 2507 connected to a display device 2509, a driving device 2513 for a removable disk 2511, an input device 2515, and a communication controller 2517 are connected to each other through a bus 2519, as illustrated in FIG. 31. The communication controller 2517 is configured to connect the mapping processing device 100 to a network. An operating system (OS) and an application program to be used to execute the processes according to the embodiment are stored in the HDD 2505. The OS and the application program are read from the HDD 2505 into the memory 2501 and executed by the CPU 2503. The CPU 2503 controls the display controller 2507, the communication controller 2517, and the driving device 2513 in accordance with details of a process of the application program and causes the display controller 2507, the communication controller 2517, and the driving device 2513 to execute predetermined operations. The CPU 2503 causes data that is being processed to be stored mainly in the memory 2501. The CPU 2503, however, may cause the data that is being processed to be stored in the HDD 2505. In the embodiment of the technique disclosed herein, the application program to be used to execute the aforementioned processes is stored in the computer-readable removable disk 2511, distributed, and installed from the driving device 2513 in the HDD 2505. The application program may be installed in the HDD 2505 through a network such as the Internet and the communication controller 2517. The computer device causes hardware such as the aforementioned CPU 2503 and the aforementioned memory 2501 and programs such as the OS and the application program to closely collaborate with each other and thereby achieves the aforementioned various functions.

The embodiment is summarized as follows.

A mapping processing method according to the embodiment includes (A) mapping, to a first spherical surface, a first model represented by polygonal elements of a first mesh and including one or more regions; (B) mapping, to a second spherical surface, a second model represented by polygonal elements of a second mesh and including regions of which the number is the same as the number of the regions of the first model; (C) approximating a boundary of the one or more regions mapped to the first spherical surface by a curve and moving, based on the curve approximation, nodes other than nodes on the boundary of the one or more regions mapped to the first spherical surface; (D) approximating a boundary of the one or more regions mapped to the second spherical surface by a curve and moving, based on the curve approximation, nodes other than nodes on the boundary of the one or more regions mapped to the second spherical surface; (E) associating the nodes on the boundary of the one or more regions mapped to the first spherical surface with the nodes on the boundary of the one or more regions mapped to the second spherical surface; (F) moving the nodes other than the nodes on the boundary of the one or more regions mapped to the first spherical surface by minimizing an evaluation value calculated according to a first evaluation equation including an item for suppressing changes of the shapes and areas of the polygonal elements of the first mesh under a constraint that the nodes on the boundary of the one or more regions mapped to the first spherical surface are placed at positions located on the first spherical surface and corresponding to the associated nodes located on the second spherical surface; and (G) calculating nodes of the second model for nodes of the first model from the nodes, corresponding to the nodes of the first model, of the first spherical surface after the movement and polygonal elements corresponding to the corresponding nodes of the first spherical surface and located on the second spherical surface.

The use of the first evaluation equation inhibits the generation of an inappropriate part such as a reversed part and achieves bijective mapping of the first model to the second model.

The aforementioned process of moving the nodes based on the curve approximation may be to move the nodes other than the nodes on the boundary of the one or more regions by minimizing the evaluation value calculated according to the first evaluation equation. This may avoid the generation of an inappropriate part such as a reversed part.

The aforementioned process of associating the nodes may include (e1) rotating the first spherical surface so as to minimize a distance between a median point, calculated for each of the one or more regions mapped to the first spherical surface, of the nodes on the boundary of the one or more regions mapped to the first spherical surface and a median point, calculated for each of the one or more regions mapped to the second spherical surface and corresponding to the one or more regions mapped to the first spherical surface, of the nodes on the boundary of the one or more regions mapped to the second spherical surface; and (e2) identifying nodes that are closest to the nodes on the boundary of the one or more regions mapped to the first spherical surface and are located in the corresponding one or more regions mapped to the second spherical surface by minimizing an evaluation value calculated according to a second evaluation equation including an item related to distances between the nodes on the boundary of the one or more regions mapped to the first spherical surface and the nodes that are located in the one or more regions mapped to the second spherical surface and are closest to the nodes on the boundary of the one or more regions mapped to the first spherical surface and an item for maintaining a ratio of an initial length of a linear element extending between the nodes on the boundary of the one or more regions mapped to the first spherical surface.

In the aforementioned process, the ratio of the initial length of the linear element of the boundary of the first spherical surface is maintained to the extent possible, and the nodes on the boundary of the first spherical surface are appropriately associated.

In addition, the first evaluation equation may include an item for minimizing the area of the surface while maintaining a volume. Thus, the nodes are placed on the spherical surface in a stable manner.

In addition, the mapping processing method may include (H) identifying a polygonal element that is among the polygonal elements of the second mesh and includes nodes located on the second model and calculated for the nodes of the first model mapped to the second model; and (I) adding, to the identified polygonal element, attribute data of corresponding nodes of the first model mapped to the second model.

In the aforementioned process, even if attribute data is not added to the second model, the attribute data added to the first model may be mapped.

A program that causes a computer to execute the aforementioned processes may be generated. The program is stored in a computer-readable storage medium such as a flexible disk, an optical disc such as a CD-ROM, a magneto-optical disc, a semiconductor memory (for example, a ROM), or a hard disk, or a storage device. Data that is being processed is temporarily stored in a storage device such as a RAM.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory storage medium storing a program that causes a computer to execute a process comprising:
    mapping, to a first spherical surface, a first model represented by polygonal elements of a first mesh and including one or more regions;
    mapping, to a second spherical surface, a second model represented by polygonal elements of a second mesh and including one or more regions of which the number is the same as the first model;
    approximating a boundary of the one or more regions mapped to the first spherical surface by a curve and moving, based on the curve approximation, nodes other than nodes on the boundary of the one or more regions mapped to the first spherical surface;
    approximating a boundary of the one or more regions mapped to the second spherical surface by a curve and moving, based on the curve approximation, nodes other than nodes on the boundary of the one or more regions mapped to the second spherical surface;
    associating the nodes on the boundary of the one or more regions mapped to the first spherical surface with a point on the boundary of the one or more regions mapped to the second spherical surface;
    moving the nodes other than the nodes on the boundary of the one or more regions mapped to the first spherical surface by minimizing an evaluation value calculated according to a first evaluation equation including an item for suppressing changes of the shapes and areas of the polygonal elements of the first mesh under a constraint that the nodes on the boundary of the one or more regions mapped to the first spherical surface are placed at positions located on the first spherical surface and corresponding to the associated points on the second spherical surface; and
    calculating a point in the second model for each of the nodes in the first model based on the corresponding node on the first spherical surface after the movement and corresponding polygonal elements on the second spherical surface.

2. The storage medium according to claim 1,
    wherein the moving based on the curve approximation is to move the nodes other than the nodes on the boundary of the one or more regions by minimizing the evaluation value calculated according to the evaluation equation.

3. The storage medium according to claim 1,
    wherein the associating includes
        rotating the first spherical surface so as to minimize a distance between a median point of the nodes on the boundary of the one or more regions mapped to the first spherical surface and a median point of the nodes on the boundary of the corresponding regions mapped to the second spherical surface, and
        identifying, for each of the nodes on the boundary of each of the one or more regions mapped to the first spherical surface, a closest point on the boundary of the corresponding region mapped to the second spherical surface by minimizing an evaluation value calculated according to a second evaluation equation including an item related to distances between the points on the boundary of the corresponding region mapped to the second spherical surface and a point on the second spherical surface corresponding to the node on the boundary of the one or more regions mapped to the first spherical surface and an item for maintaining a ratio of an initial length of a linear element extending between the nodes on the boundary of the one or more regions mapped to the second spherical surface.

4. The storage medium according to claim 1,
    wherein the first evaluation equation further includes an item for minimizing the area of the surface while maintaining a volume.

5. The storage medium according to claim 1, storing the program that causes the computer to execute the process further comprising:
    identifying, for each of the nodes of the first model after mapping to the second model, a polygonal element that is among the polygonal elements of the second mesh and includes a point calculated for the node of the first model; and
    adding, to the identified polygonal element, attribute data of corresponding nodes of the first model mapped to the second model.

6. A mapping processing method to be executed by a computer and including a process comprising:
    mapping, by the computer, to a first spherical surface, a first model represented by polygonal elements of a first mesh and including one or more regions;
    mapping, to a second spherical surface, a second model represented by polygonal elements of a second mesh and including one or more regions of which the number is the same as the first model;
    approximating, by the computer, a boundary of the one or more regions mapped to the first spherical surface by a curve and moving, based on the curve approximation, nodes other than nodes on the boundary of the one or more regions mapped to the first spherical surface;
    approximating, by the computer, a boundary of the one or more regions mapped to the second spherical surface by a curve and moving, based on the curve approximation, nodes other than nodes on the boundary of the one or more regions mapped to the second spherical surface;
    associating, by the computer, the nodes on the boundary of the one or more regions mapped to the first spherical surface with points on the boundary of the one or more regions mapped to the second spherical surface;
    moving, by the computer, the nodes other than the nodes on the boundary of the one or more regions mapped to the first spherical surface by minimizing an evaluation value calculated according to a first evaluation equation including an item for suppressing changes of the shapes and areas of the polygonal elements of the first mesh under a constraint that the nodes on the boundary of the one or more regions mapped to the first spherical surface are placed at positions located on the first spherical surface and corresponding to the associated nodes on the second spherical surface;
    calculating, by the computer, for each of the nodes of the first model, a point in the second model based on the node corresponding to the node of the first spherical surface after the movement and polygonal elements corresponding to the corresponding nodes of the first spherical surface and located on the second spherical surface; and
    displaying, on a display device, the second model with the calculated points.

7. A mapping processing device comprising:
    a first processing unit configured to map, to a first spherical surface, a first model represented by polygonal elements of a first mesh and including one or more regions, map, to a second spherical surface, a second model represented by polygonal elements of a second mesh and including one or more regions of which the number is the same as the first model, approximate a boundary of the one or more regions mapped to the first spherical surface by a curve and moving, based on the curve approximation, nodes other than nodes on the boundary of the one or more regions mapped to the first spherical surface, and approximate a boundary of the one or more regions mapped to the second spherical surface by a curve and moving, based on the curve approximation, nodes other than nodes on the boundary of the one or more regions mapped to the second spherical surface;

a second processing unit configured to associate the nodes on the boundary of the one or more regions mapped to the first spherical surface with points on the boundary of the one or more regions mapped to the second spherical surface;

a third processing unit configured to move the nodes other than the nodes on the boundary of the one or more regions mapped to the first spherical surface by minimizing an evaluation value calculated according to a first evaluation equation including an item for suppressing changes of the shapes and areas of the polygonal elements of the first mesh under a constraint that the nodes on the boundary of the one or more regions mapped to the first spherical surface are placed at positions located on the first spherical surface and corresponding to the associated points on the second spherical surface; and a fourth processing unit configured to calculate points in the second model for nodes of the first model from the nodes, corresponding to the nodes of the first model, of the first spherical surface after the movement and polygonal elements corresponding to the corresponding nodes of the first spherical surface and located on the second spherical surface.

\* \* \* \* \*